United States Patent [19]

Moseley

[11] 4,222,242

[45] Sep. 16, 1980

[54] FLUID FLOW TRANSFER

[76] Inventor: Thomas S. Moseley, 4009 Beltsville Rd., #6, Beltsville, Md. 20705

[21] Appl. No.: 888,554

[22] Filed: Mar. 20, 1978

Related U.S. Application Data

[63] Continuation-in-part of Ser. No. 706,698, Jul. 22, 1976, abandoned.

[51] Int. Cl.³ .............................................. F01B 21/00
[52] U.S. Cl. ...................................... 60/698; 60/262; 60/269; 239/8; 239/404
[58] Field of Search ......................... 60/262, 269, 698; 239/8, 402, 403, 404, 432

[56] References Cited

U.S. PATENT DOCUMENTS

| 2,558,816 | 7/1951 | Bruynes | 60/39.72 R |
|---|---|---|---|
| 2,576,981 | 12/1951 | Vogt. | |
| 2,603,949 | 7/1952 | Brown | 60/39.72 R |
| 2,844,001 | 7/1958 | Alford | 60/39.5 |
| 2,934,889 | 5/1960 | Poulos | 239/404 |
| 3,830,431 | 3/1973 | Schwartz | 60/262 |
| 3,913,332 | 10/1975 | Forsman. | |
| 4,045,144 | 8/1977 | Loth. | |

OTHER PUBLICATIONS

Hoerner, S. F., "Fluid-Dynamic Drag", published by author, 1958, pp. 3-5, 3-6, 7-14, 7-15, 7-16, 16-35.

Primary Examiner—Robert E. Garrett
Attorney, Agent, or Firm—Thomas S. Moseley

[57] ABSTRACT

A method and apparatus for transferring energy from a first fluid flow to a second fluid flow via vortex generating means. Various embodiments and various support means for elements of the apparatus are also disclosed.

24 Claims, 43 Drawing Figures

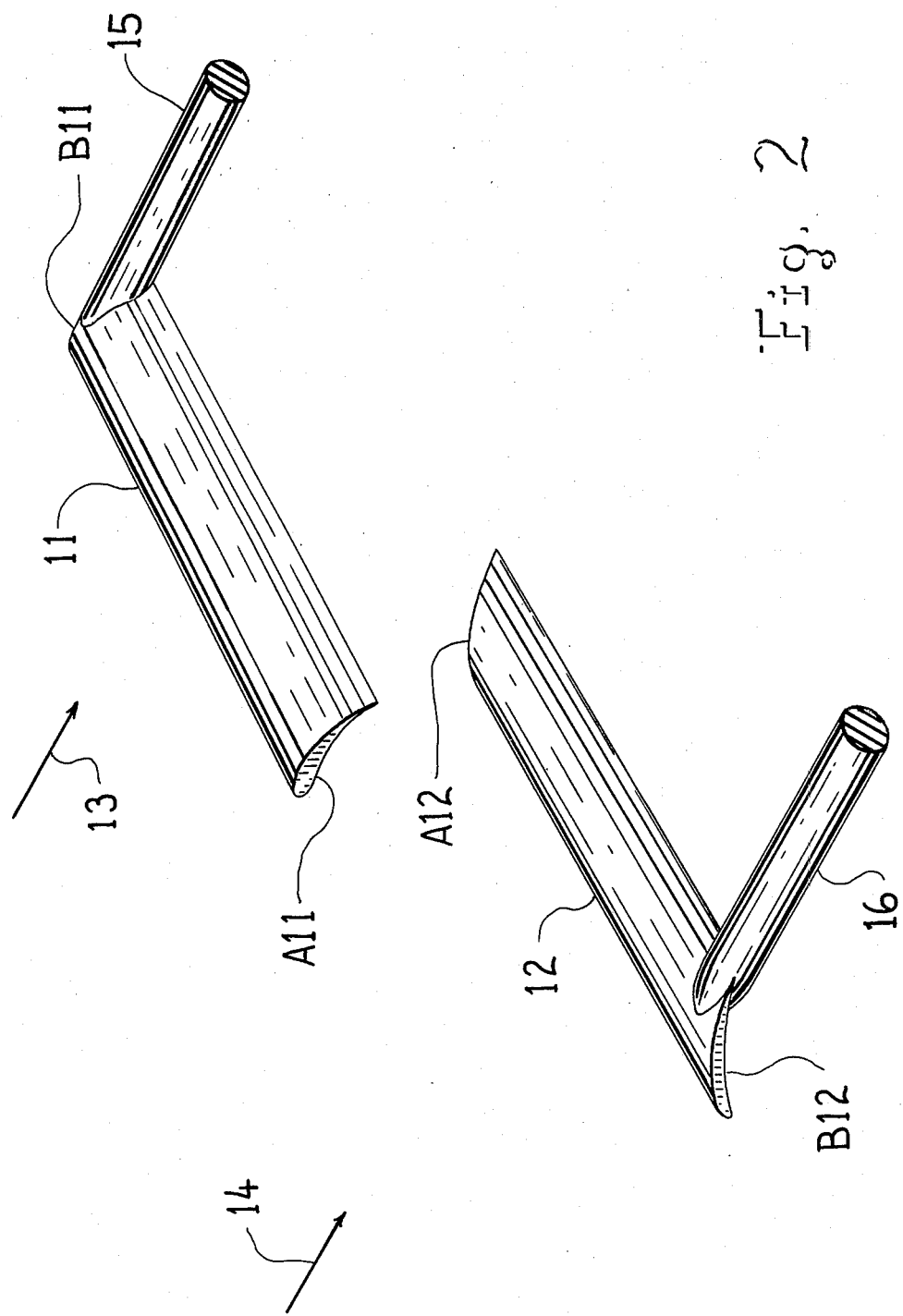

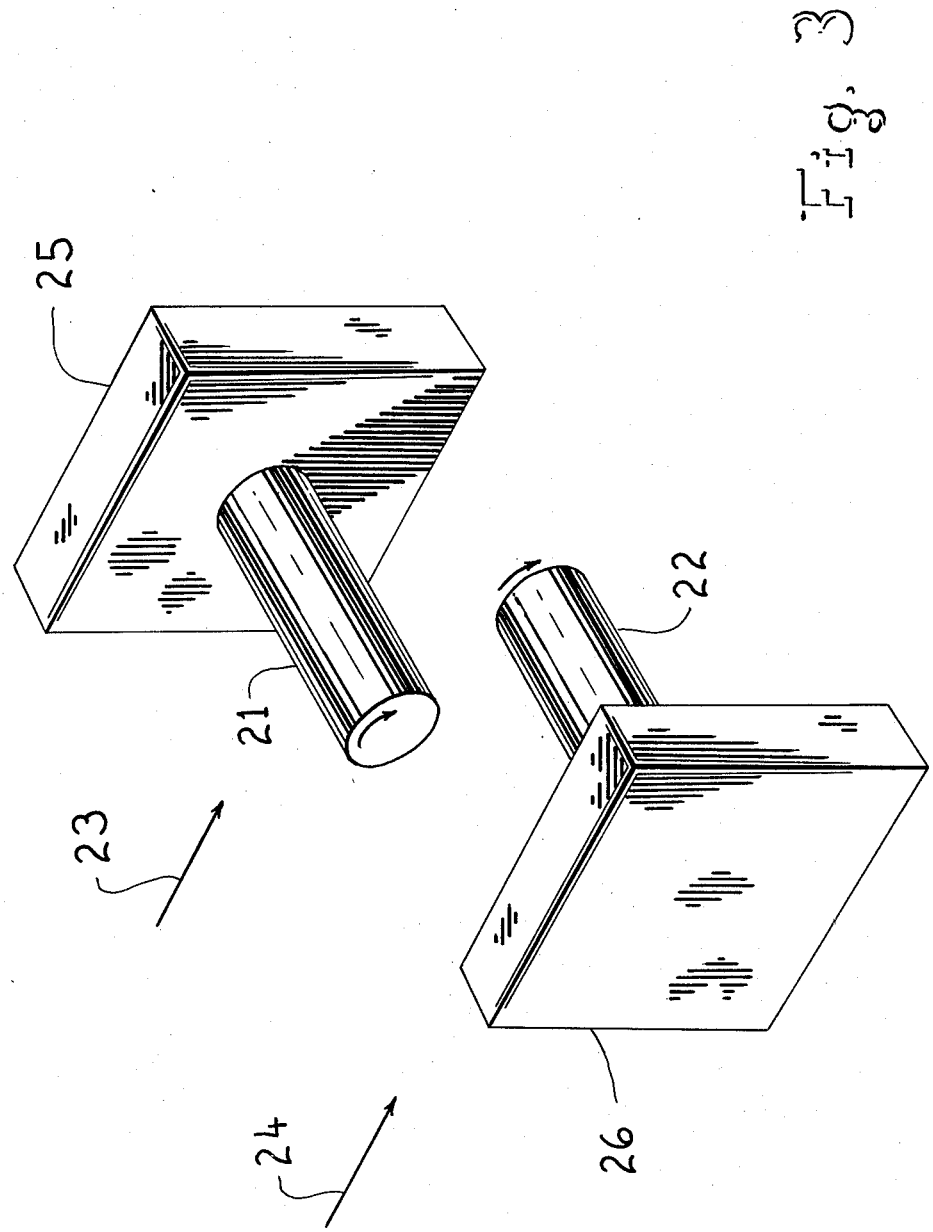

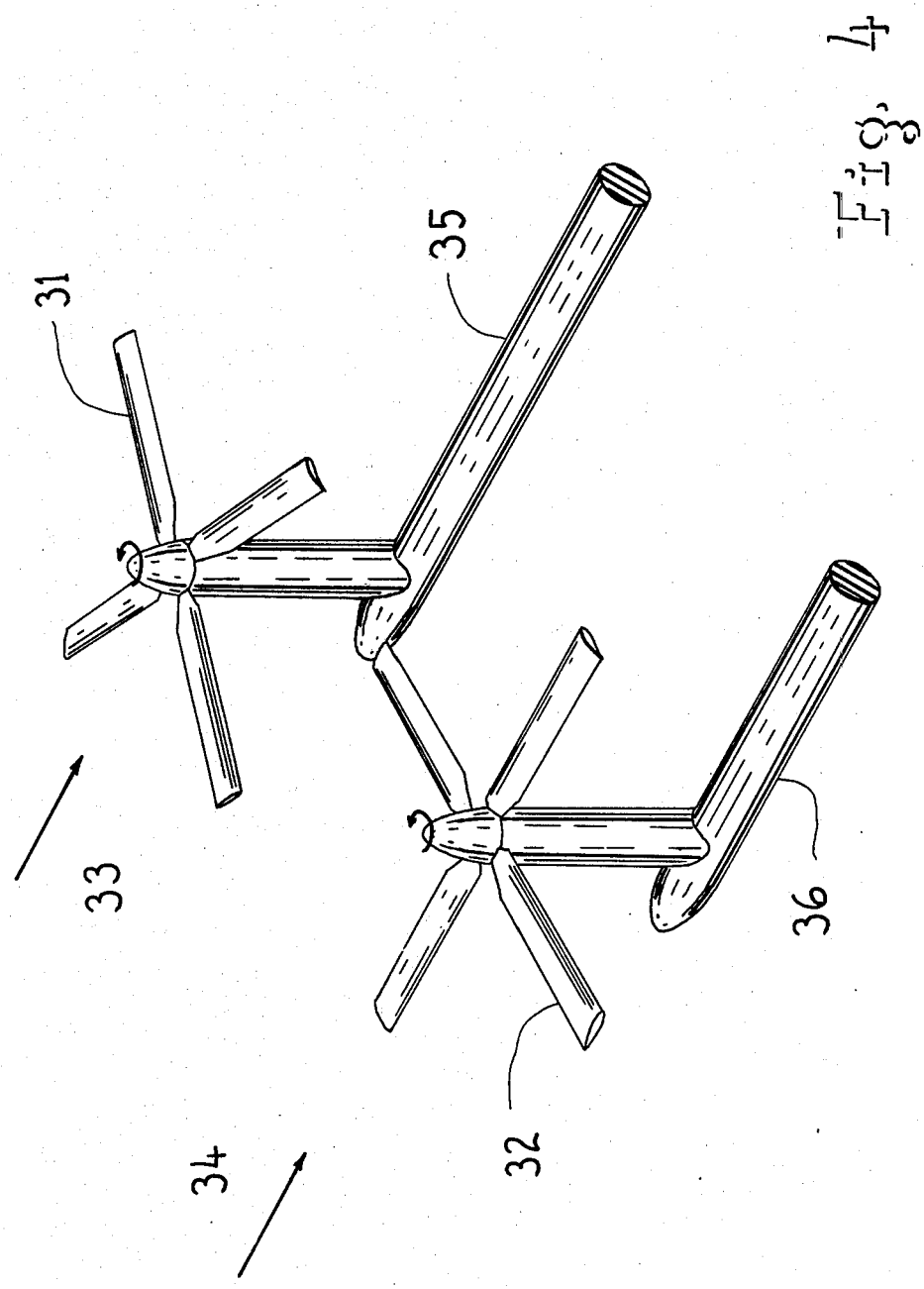

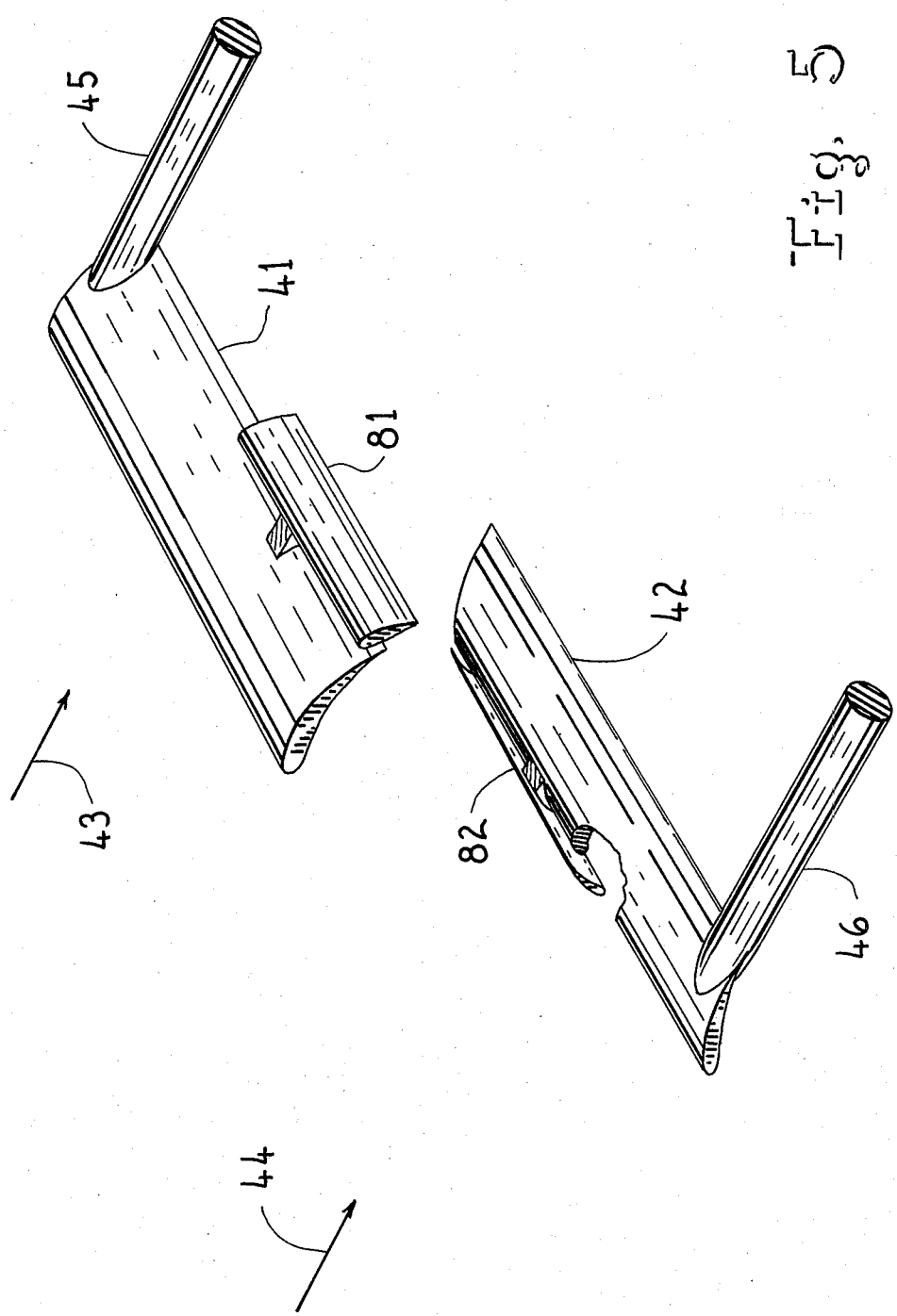

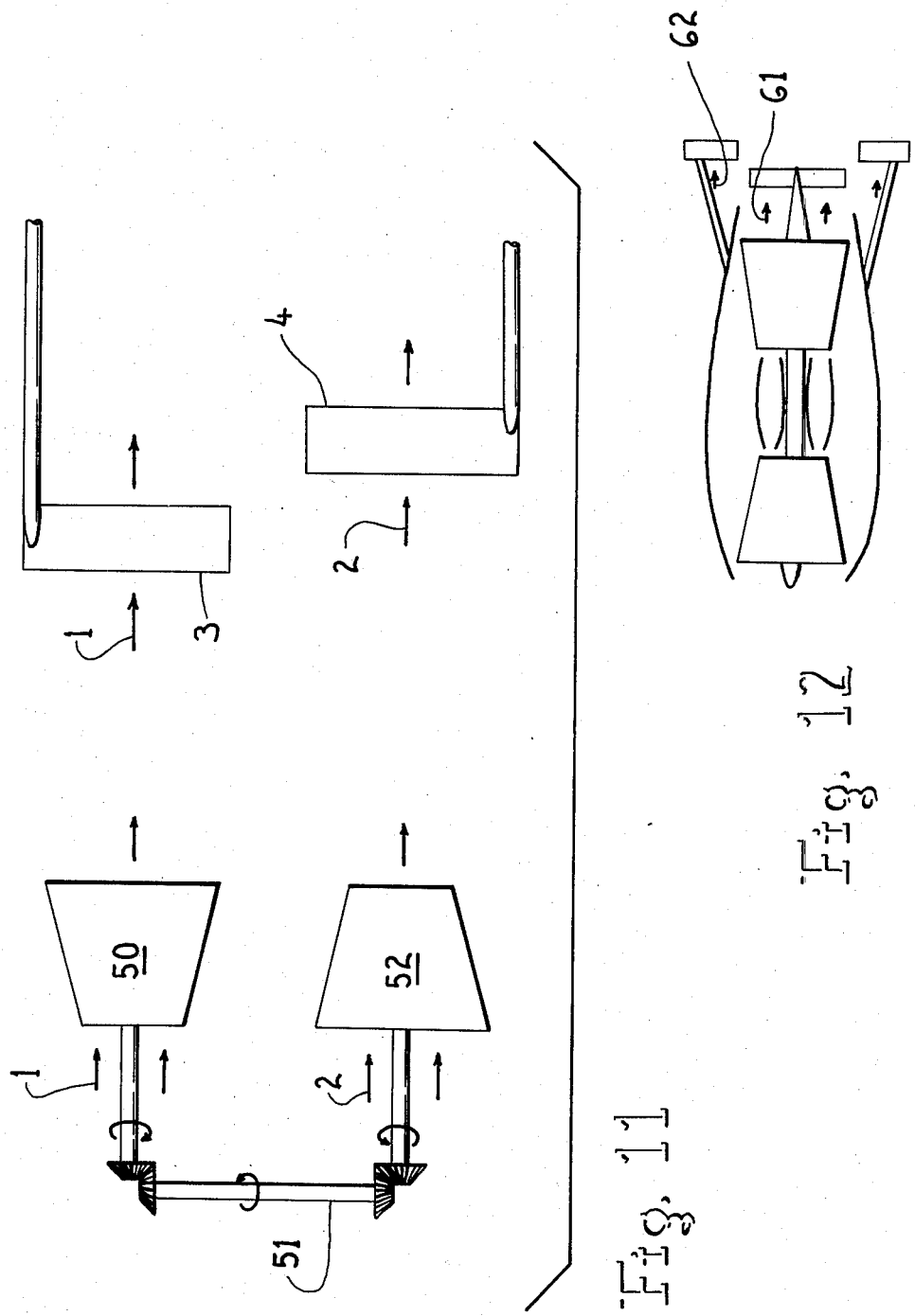

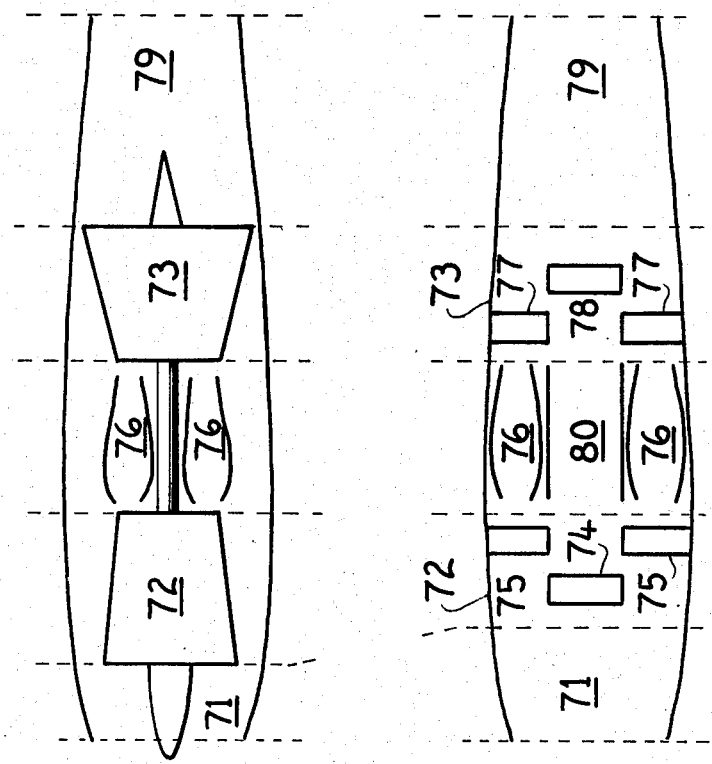

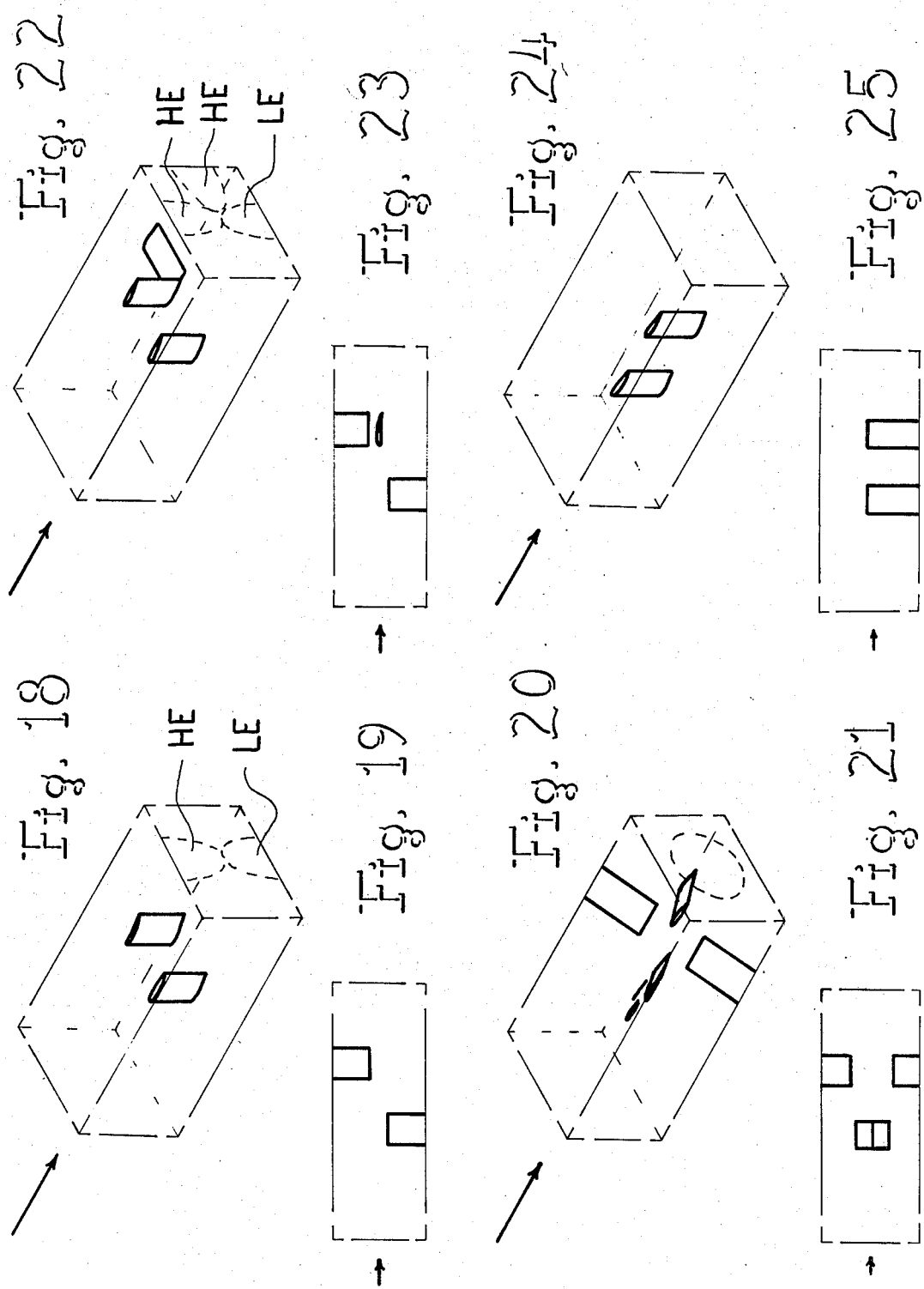

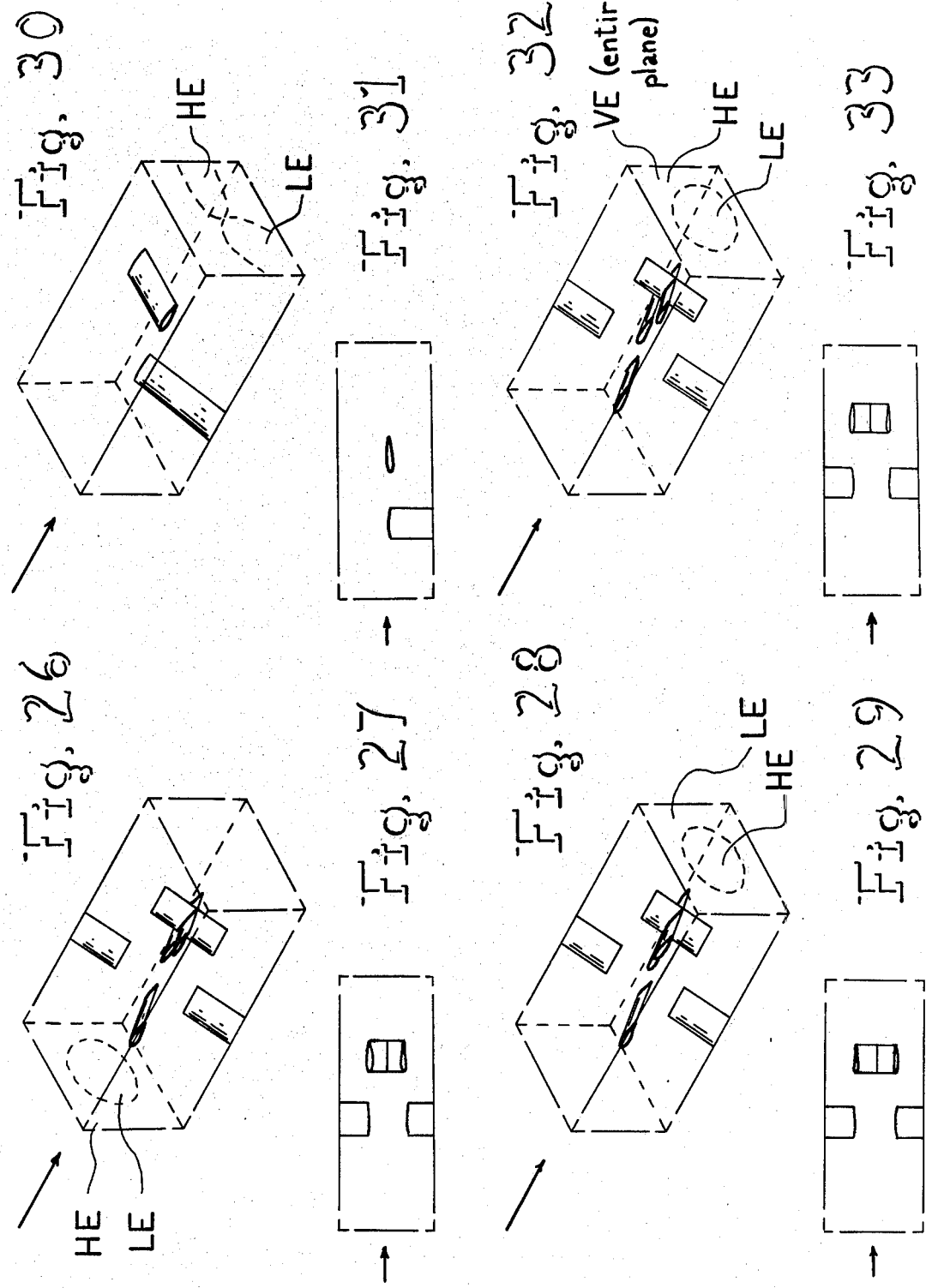

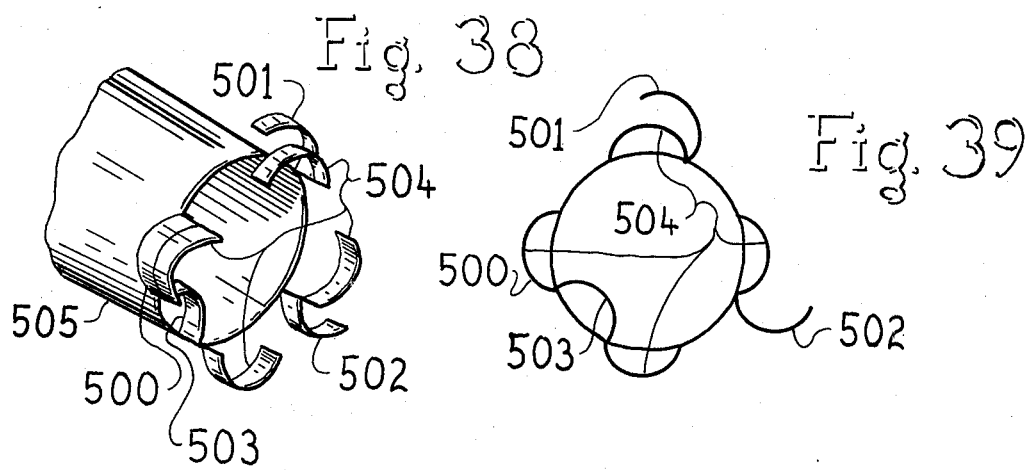
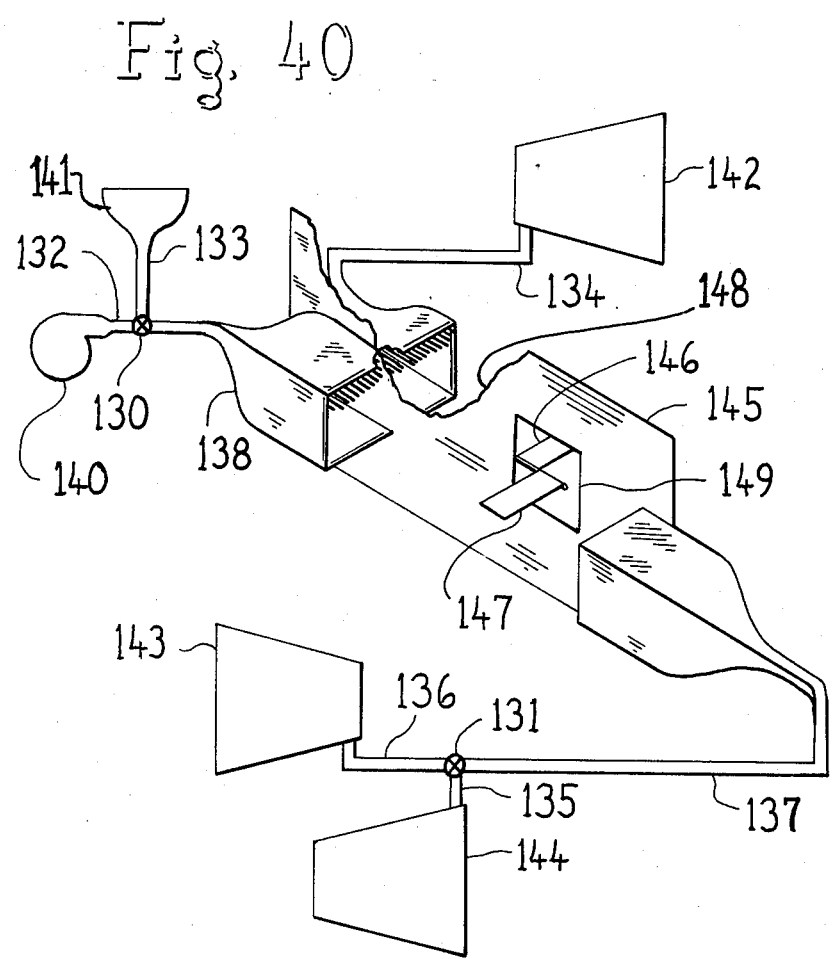

FLUID FLOW TRANSFER

THE INVENTION

The present invention relates to a method and apparatus for transferring energy from one fluid flow to another. It is a continuation-in-part of the inventive concepts presented in U.S. patent application Ser. No. 706,698 for "Fluid Flow Energy Transfer" filed July 22, 1976, now abandoned.

BACKGROUND OF THE INVENTION

There are three basic methods which are known for transferring energy from a first fluid flow to a second. They are indirect transfer by dynamic machines, direct nonsteady-flow transfer by pressure waves, and direct steady-flow transfer by mixing of the fluid flows.

The indirect nonsteady-flow transfer by dynamic machines may be exemplified by considering a turbo charger where energy is extracted from one flow by a turbine and added to a second flow by a compressor mechanically coupled to the turbine.

Direct nonsteady-flow transfer by pressure wave is a type of energy transfer normally associated with the operation of a pulse jet engine. The energy transfer is accomplished by air which enters the tail pipe of the engine and bodily compresses the air in the combustor of the engine, there being a transfer of energy without significant mixing of the bodies of air.

Direct steady-flow transfer by fluid mixing involves a high energy primary flow and a low energy secondary flow. The two flows are merged or mixed in a common duct where there is a transfer of momentum and a redistribution of the energy of the flows. The flow emerging from the mixing duct has an energy level which is between the levels of the two initial flows.

It is further known to employ apparatus to shape, redirect or otherwise act on the exhaust of a reaction motor to thereby vary certain characteristics of the exhaust. U.S. Pat. Nos. 3,273,654; 3,731,489; 3,981,451 and 4,036,452 disclose apparatus where an entire pivotally mounted assembly may be placed in such an exhaust. It is also known to vary the area of an exhaust nozzle by means of a variable nozzle made up of connected elements. And U.S. Pat. Nos. 3,441,219 and 3,664,455 disclose apparatus comprised of a number of elements each of which is pivotable about an axis parallel to the exhaust flow. And in compressors, it is known to provide variable inlet guide vanes and stator blades. However, none of these prior art devices use vortex generators as energy transfer means.

OBJECTS OF THE INVENTION

The three methods of energy transfer categorized above represent the principles by which all existing fluid flow energy transfer devices function. These three methods have many disadvantages and inefficiencies which may be overcome by utilizing the principles of the invention disclosed herein.

It is a primary objective of this invention to provide a method and apparatus for steady-flow transfer of energy between two flow streams which involves less entropy increase than occurs with simple mixing of the flows due to the introduction of a reversible process obtained by the invention disclosed herein.

A further objective of the instant invention is to provide a method and apparatus for obtaining steady-flow energy transfer between two flow streams which is independent of fluid viscosity and dependent on a process predictable as an extension of lifting line theory.

A further objective of the invention is to provide a means of fluid flow energy transfer duplicating the functions of a compressor and turbine without the use of moving mechanical devices.

Another objective of the invention is to create a jet engine having no moving parts.

Further an object of the present invention is to provide mounting means for energy transfer vortex generators useful in apparatus obtaining the above objects such that (1) elements may be retracted into a non-obstructive position where no or little energy transfer is obtained, (2) the elements may be deployed to an energy transfer position, (3) and the elements may be positioned in positions intermediate to (1) and (2) while obtaining some or no energy transfer.

Another object is to provide a multi-staged arrangement of energy transfer vortex elements mounted for selective deployment.

Yet another object is to provide a retractable thrust augmentor.

Another object is to provide a retractable compressor.

Yet another object is to obtain the above objects by mechanically simple apparatus.

The foregoing and other objectives of the invention will become apparent in light of the drawings, specifications and claims contained herein.

SUMMARY OF THE INVENTION

This invention is directed to a method and apparatus for transferring energy from a first fluid flow to a second fluid flow. The invention in its various embodiments only uses fluid dynamic effects for energy transfer and does not require the use of moving mechanical devices in the mechanically simple embodiments. The mechanical devices which are incorporated in the various embodiments of the invention are static mechanical means or relatively simple mechanical means to create desired fluid flow patterns.

The basic energy transfer principles of the subject invention include generating a vortex by means of a vortex generator which is in a first fluid flow and transferring the extracted energy into a second fluid flow by means of a second vortex generator which is in the second fluid flow, where the two fluid flows share a free surface (contact each other).

TYPES OF VORTICES

There are two kinds of vortices recognized in the art, the first being a free vortex as exemplified by the weather disturbance called a tornado and having the characteristic that it may travel about as driven by currents in the atmosphere. The second kind of vortex is called a bound vortex and is exemplified by the flow at a corner at the lee of a building. A bound vortex does not move with the flow but rather is effectively attached to an object which is therefore called a vortex generator. Should the vortex generator move, the vortex is bound to the generator and is constrained to move with the vortex generator. It should be observed that a flow passing over such a vortex generator and interacting therewith generates a vortical flow pattern generally having both bound and free vortex portions and also generates a force on the vortex generator as is well known to those familiar with lifting line theory. It will be noted that the product of induced drag force times flow velocity is a rough measure of the energy of the trailed vorticity.

FLUID PARTICLE BEHAVIOR

A vortex generator generally comprises an element having a certain pressure distribution over the surfaces thereof. The differential elements of fluid in the flow are accelerated toward the low pressure regions on the surface of the vortex generator and accelerated away from the high pressure regions on the surface of the vortex generator. The net acceleration on any given differential element may be determined by adding the acceleration components vectorially. The vortex which trails from a finite span vortex generator as known in the art is a stable flow pattern maintained by the momentum of the fluid which has been accelerated in passage over and around the vortex generator. Thus, a vortex pattern may be considered to be the result of the pressure distribution in the flow. A free vortex keeps "spinning" because of the momentum of the fluid elements traveling around the low pressure region near the vortex filament or core and because there is no mechanism to stop the "spinning" (inviscid flow is assumed). This basis for mathematically analyzing vortical flow is not as convenient as the conventional basis or model because the path of any given differential element of fluid is a function of the second integral with respect to time of the acceleration where the acceleration is a function of the path. However, the vectorial acceleration approach outlined above does suggest certain aspects of the flow patterns involved in the devices which embody the present invention. Since the fluid in the usual simple vortical flow analysis is inviscid, acceleration forces exerted on any differential fluid element must be based entirely on pressure forces exerted or applied to the faces of the fluid element (ignoring body forces). Also, it should be noted that pressure related acceleration forces may be transmitted through the fluid to influence any differential fluid element anywhere in the fluid providing the velocity of propagation of the acceleration forces through the fluid is greater than the velocity of the fluid flowing past the vortex generator. Furthermore, a turbulent layer would not prove a barrier to pressure related acceleration forces since the layer would be accelerated, thereby conveying the acceleration forces through the layer. Thus, effects obtained using a real fluid having viscosity in embodiments of the present invention are only slightly different from those obtained by using an inviscid fluid. And perhaps of greatest importance of any conclusion gained from the vectorial acceleration basis of regarding fluid flow, the pressure related forces originating from the surfaces of a vortex generator which is within a first fluid flow will be transmitted into a second fluid flow (which is in contact with the first fluid flow) even though the second flow has a velocity differing from that of the first fluid flow either in magnitude or direction or both. The velocity components induced by a vortex generator are approximately perpendicular to the upstream free stream velocity vector of the fluid flow.

THEORETICAL PRINCIPLE OF OPERATION

A vortex generator disturbs the flow passing therearound and may increase or decrease the vorticity of the flow. Such changes in the vorticity of a fluid flow are accompanied by changes in the form of the energy of the flow. That is, if the vorticity of the flow is increased as a result of the flow passing a vortex generator, the energy of the flow prior to its disturbance by the vortex generator is redistributed so that some of the energy of the flow becomes associated with the creation of the vortex and remains associated therewith until such time as the vortex is decreased in strength. Similarly, a decrease in the vorticity of a fluid flow results in the release of energy associated with the vorticity of the flow into an increase of flow energy (providing viscous effects are not relied on in which case the energy goes into heat).

A vortex generator may increase the vorticity of a fluid flow thus converting non-vortically associated energy into vortically associated energy or may decrease the vorticity of a fluid flow thus converting the vortically associated energy into non-vortically associated energy. There must be vortically associated energy (and thus vorticity) in a fluid flow before such energy is available to be converted into non-vortically associated energy.

Considering the above, it becomes possible to transfer energy from one region or portion of a fluid flow to another (considered to be the same situation as two fluid flows which are in contact with each other). This is accomplished by placing a vortex generator in the first portion of the fluid flow (or the first flow) from which it is desired to remove energy and placing a second vortex generator in the portion of the flow (or the second flow) in which it is desired to increase the non-vortically associated energy: the second vortex generator is adjusted so that it reduces the vorticity of the fluid flow passing thereby and thus converts the vortical energy drawn by the first vortex generator from the first portion of the flow into non-vortical energy.

DESCRIPTION OF THE DRAWINGS

In the drawings, which illustrate the primary embodiments of the instant invention;

FIG. 2 is a perspective view of two vortex generators oriented to form a principal embodiment of the present invention.

FIG. 3 is an embodiment of the present invention incorporating rotating Magnus Effect cylinders.

FIG. 4 is an enlargement of the present invention incorporating helicopter type rotors.

FIG. 5 is an embodiment of the present invention incorporating multi-element airfoils.

FIG. 11 is a graphic comparison of a compressor and turbine energy transfer system of known design and a functional equivalent utilizing the principles of the invention disclosed herein.

FIG. 12 is a thrust augmentation system for a jet engine utilizing the energy transfer principles of the instant invention.

FIG. 13 is a schematic representation of a conventional jet engine.

FIG. 14 is a schematic representation of a jet engine constructed in accordance with the principal embodiment of the instant invention.

FIGS. 18 through 33 show perspective and side views of illustrative arrangements of vortex generators, in particular, airfoils placed within various flows to effect particular energy redistributions in the flows. The energy distributions in the incoming and exhausting flows are indicated by the mapping of energy levels onto transverse-to-flow planes upstream and downstream of the vortex generators shown in the perspective views. The flows travel left to right in the side views and from left rear to right front in the perspective views. The only solid objects shown in the figures are the airfoils. The magnitude and direction of the vortices generated are adjusted in accordance with teachings in the specification to obtain the described flow patterns.

FIGS. 18 and 19 are perspective and side views, respectively, of an arrangement of airfoils where a non-vortical flow with homogenous energy distribution is acted upon by the airfoils to give an exhaust flow having both low and high non-vortically associated energy flow regions.

FIGS. 20 and 21 are perspective and side views of an arrangement of airfoils where a non-vortical flow with homogeneous energy distribution is acted upon by the airfoils to give an exhaust flow which is roughly non-vortical and having a low non-vortically associated energy flow region surrounded by a high non-vortically associated energy flow region. This embodiment has utility as a compressor.

FIGS. 22 and 23 are perspective and side views of an arrangement of airfoils wherein a non-vortical flow with homogeneous energy distribution is acted upon by the airfoils to give an exhaust flow having a low and two high non-vortically associated energy flow regions. This arrangement also uses three vortex generators and illustrates the use of an odd number of vortex generators in a device according to the present invention.

FIGS. 24 and 25 are perspective and side views of an arrangement of airfoils where a non-vortical flow with homogeneous energy distribution is acted upon by the airfoils such that there is a net cancellation of the effect of the airfoils on the flows so that the exhausting flow also has a homogeneous distribution of non-vortically associated energy.

FIGS. 26 and 27 are perspective and side views of an arrangement of airfoils where a flow comprised of a high non-vortically associated energy flow surrounding a low non-vortically associated energy flow is acted upon by the airfoils to give a homogeneously distributed non-vortically associated energy flow.

FIGS. 28 and 29 are perspective and side views of an arrangement of airfoils where a non-vortical flow with homogeneous energy distribution is acted upon by the airfoils to give an exhaust flow which is roughly non-vortical and having a low non-vortically associated energy flow region surrounding a high non-vortically associated energy flow region.

FIGS. 30 and 31 are perspective and side views of an arrangement of airfoils where a non-vortical flow with homogeneous energy distribution is acted upon by the airfoils to give an exhaust flow having both low and high non-vortically associated energy flow regions where the angular (dihedral) relation between the airfoils affects the location of the regions in the exhaust.

FIGS. 32 and 33 are perspective and side views of an arrangement of airfoils where a non-vortical flow with homogeneous energy distribution is acted upon by the airfoils to give a vortical exhaust having a high non-vortically associated energy region surrounded by a low non-vortically associated energy region.

FIGS. 38 and 39 show in perspective and schematically respectively the use of a different kind of vortex generator in a usage like that of FIGS. 35 and 36.

FIG. 40 shows both schematically and in cutaway perspective an arrangement of elements suggesting a general usage of the present invention.

DESCRIPTION OF THE INVENTION

Figure 1:
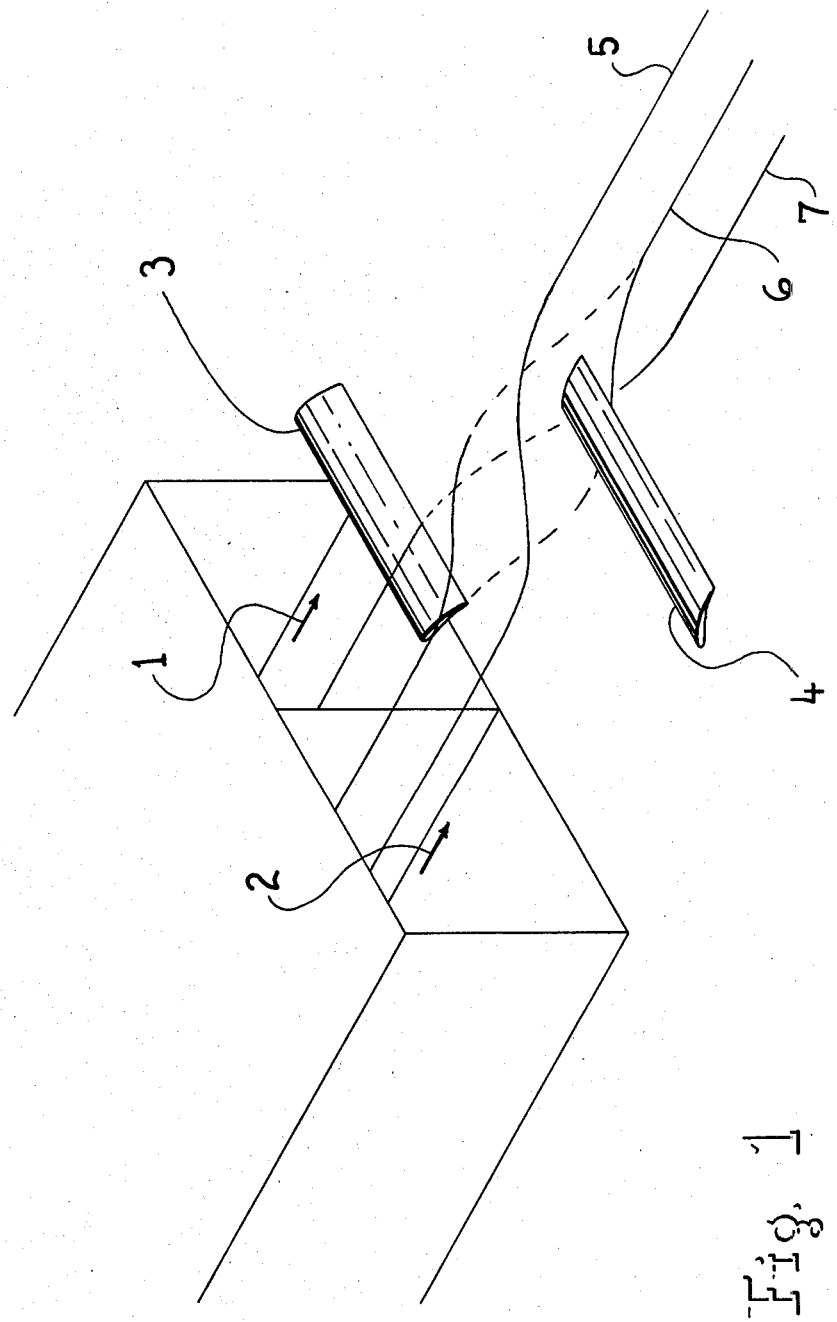
FIG. 1 is a perspective view of two vortex generators adapted to create interacting vortices.

Referring to the drawings, FIG. 1 illustrates the basic principles of the instant invention. In this illustration, 1 and 2 represent two fluid flows having the same or different velocity or energy levels. A vortex generator 3 is positioned in flow 1 while a second vortex generator 4 is positioned in flow 2. The two vortex generators are positioned so that the vortex generated by one vortex generator influences the flow passing about the other vortex generator. This influence of the flow passing about the other vortex generator results in an energy transfer from one flow to the other providing certain easily attained conditions are met.

In FIG. 1, the first and second vortex generators are shown as being airfoils. The angles of attack and position of the airfoils are adjusted to meet specific requirements to accomplish the energy transfer. More to the point, the angles of attack are adjusted to generate vortices of particular strengths. A description of the various parameters and their influence on energy transfer is to be found hereinbelow. Lines 5, 6 and 7 represent flow streamlines passing the vortex generators. The passages from which the flows 1 and 2 are shown to be issuing are intended to help illustrate the flows 1 and 2 in the perspective view of FIG. 1.

In FIG. 2 which shows a first embodiment of the present invention, airfoils 11 and 12 are vortex generating means which are suitably supported within fluid flows 13 and 14 respectively such as by the exemplary support stings 15 and 16; the airfoils are positioned so that the airfoils generate the vortices necessary to the proper operation of the present invention. A11 and A12 identify the adjacent ends of airfoils 11 and 12 respectively; B11 and B12 identify the ends of airfoils 11 and 12 respectively which ends are opposite ends A11 and A12.

Figure 8:
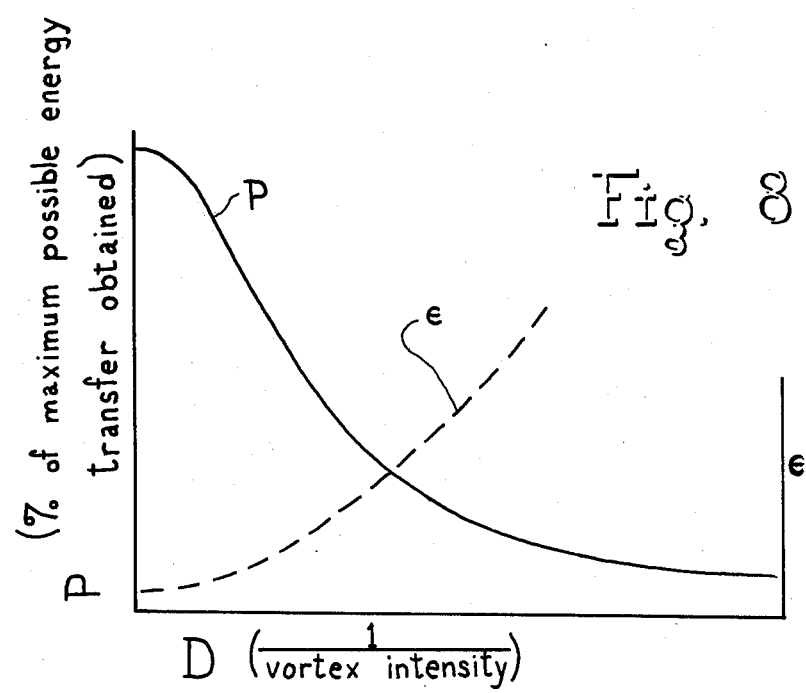

As may be seen in FIG. 2, there are two fluid flows where the first fluid flow 13 passes over vortex generating air-foil 11 which gives a vortical flow pattern to the first flow 13. Similarly, fluid flow 14 passes over vortex generating airfoil 12 which gives a vortical flow pattern to the second flow 14. Providing the fluid flows 13 and 14 may influence each other by pressure disturbances, the vortical flow pattern induced in either flow extends into the other flow even when the flows have differing velocities. Airfoil 11 induces a vortical flow pattern in the flow 13 and also in the flow 14 providing the fluid flow 14 is in pressure disturbance communication with flow 13. (Pressure disturbance communication is defined below and is closely related to the pressure related acceleration forces mentioned above). Similarly, airfoil 12 induces a vortical flow pattern in the flow 14 and also in the flow 13 providing the fluid flow 13 is in pressure disturbance communication with fluid flow 14. The pressure disturbance communication between the two fluid flows 13 and 14 should be maximized for optimal operation of the present invention in this and all embodiments. Thus, a solid boundary such as a wall to prevent mixing of flows 13 and 14 may not be placed to prevent the generation of vortices by the tips A11 and A12 and solid objects should be kept from the region between these tips as much as is possible. Also the vorticity generated by airfoil 11 (i.e. tip A11) should be concentrated and centered as near to the flow 14 as practical while the vorticity generated by airfoil 12 (i.e. tip A12) should be concentrated and centered as near to flow 13 and the vorticity trailed from tip A11 as practical thereby maximizing interflow vorticity related induced flow velocity components and thus energy transfer (FIG. 8). Flows 13 and 14 may have nearly equal or widely differing velocities and may be generally parallel and in the same direction or flow markedly non-parallel with an attendant decrease in energy transfer. By way of definition, a given second fluid flow is considered to be in pressure disturbance communication with a first fluid flow if a flow deflection in the first fluid flow (such as is caused by a change in the distribution of pressure on the surfaces which serve as boundaries of the first fluid flow) causes a deflection of the second fluid flow and a change in the flow pattern in the second flow.

The principle of operation of the embodiment of the present invention illustrated in FIG. 2 is as follows: airfoil 11 induces a vortical flow in the fluid flow 13 and also in the fluid flow 14. The energy which was originally associated with the velocity of the flow 13 approaching airfoil 11 is redistributed into energy associated with flow velocity parallel to the approaching flow 13 and energy associated with the vortical flow pattern induced in the flow 13 and in the flow 14. Airfoil 12 decreases the vorticity of the flow passing thereby. The total final non-vortically associated energy of the flow 14 is the sum of the energy of the flow 14 (which energy is associated with the velocity of approach of the flow 14 as it approaches airfoil 12) and the energy associated with the vortical flow pattern induced in fluid flow 14 by the action of the airfoil tip A11 in flow 13 and reconverted into non-vortically associated energy by airfoil tip A12. The net effect is to increase the energy (and thus velocity) of flow 14 at the expense of energy (and thus velocity) of flow 13.

Airfoil tips A11 and A12 in FIG. 2 are commonly considered to trail vortices and it is these vortices which are responsible for most of the energy transfer. Tips B11 and B12 trail vortices which will be of such a direction of rotation as to decrease the energy transfer obtained by the action of tips A11 and A12. However, the vortices trailed from the tips B11 and B12 are laterally separated from the region of the flow where the vortices trailed from tips A11 and A12 interact and thus will be generally of negligible detriment to energy transfer.

FIGS. 3, 4 and 5 disclose respectively alternate embodiments of the present invention using rotating Magnus Effect cylinders 21 and 22, helicopter type rotors 31 and 32 and multielement airfoils 41 and 42 as vortex generating means. In each of these embodiments, the elements 11, 21, 31 and 41 are similar in function to each other, that is, they influence the fluid flows passing thereover in similar ways at least for the purposes of the present invention. Likewise, elements 12, 22, 32 and 42 are similar to each other in function and, through the medium of the fluid flowing through the respective embodiments, similar in interaction with elements 11, 21, 31 and 41. Thus, the flows in each of these embodiments are similar in flow pattern and thus are numbered 13, 23, 33 and 43 and 14, 24, 34 and 44. Analogous elements and analogous flows in the embodiments have the same second digit in the identifying numbers; the first digit indicates the embodiment. Thus, support means are indicated by 15, 25, 35 and 45 and 16, 26, 36 and 46 in the embodiments of FIGS. 2, 3, 4 and 5 respectively.

The rotors 31 and 32 of FIG. 4 may be driven or freewheeling (auto rotating). In the embodiment of FIG. 3, the cylinders 21 and 22 are preferably rotationally driven. All of the embodiments of the present invention may use adjustable means such as a flap (FIG. 5, element 81), a leading edge slat (FIG. 5, element 82), boundary layer control means or any other known modification to an airfoil. Additional control of the embodiments may be accomplished by varying the angle of attack of the airfoils of the embodiment of FIG. 2, the rotational speed of the cylinders of the embodiment of FIG. 3, the pitch of the rotor axes, pitch of individual blades on the rotors and rotational speed of the rotors of the embodiment of FIG. 4, and the angles of attack of the airfoils and individual elements of the airfoils of the embodiment of FIG. 5. Varying flow conditions may thereby be accommodated.

In each of the embodiments of FIGS. 2, 3, 4 and 5, the first and second fluid flows are shown as being essentially parallel to each other as the flows approach the various vortex generating means. To have these flows parallel and flowing in the same direction is particularly desirable as indicated above. It should be noted that the sense of direction or rotation of one vortex in one flow is preferably opposite to that of the vortex in the other flow so that the net vorticity downstream of the energy transfer area may be minimal and less than the vorticity in the area of energy transfer. The opposing directions or senses of vorticity permit cancellation of the vorticity to a large extent. (As noted elsewhere, the vorticity is desirably concentrated to thereby make vortex cancellation easier and to maximize non-vortically associated energy transfer). Since vorticity has energy associated therewith, maximum efficiency of energy transfer is obtained when the net trailing vorticity is minimal (unless a vortical flow output is desired). Also, since vorticity tends to promote flow mixing, it may be desirable from the standpoint of minimizing mixing between flows to minimize the trailing vorticity. Vorticity can most easily be minimized when the vorticity is concentrated into essentially single vortices located near the interface between the flows involved in the energy transfer as indicated elsewhere. Due to the nature of vortices and difficulties in adequately describing a direction of rotation of vorticity (as opposed to a single vortex), references herein to a vortex and a sense or direction of rotation thereof may be considered to describe a general direction of rotation of a region of a flow having vorticity, an approximate equivalence often made in the art.

Figure 6A:
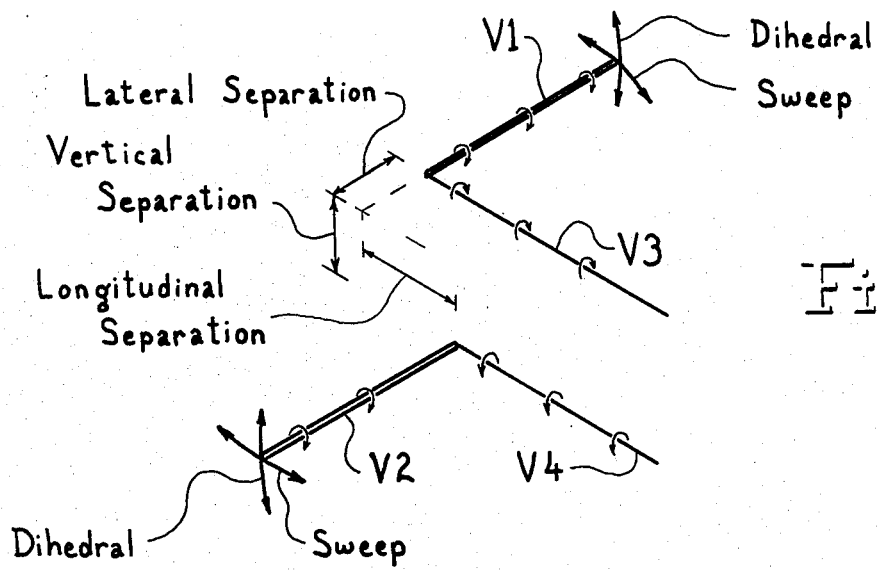
FIGS. 6A, 6B and 6C are perspective, side, and end views respectively schematically showing the vortex equivalent of the embodiments of FIGS. 2 through 5.
Figure 6B:
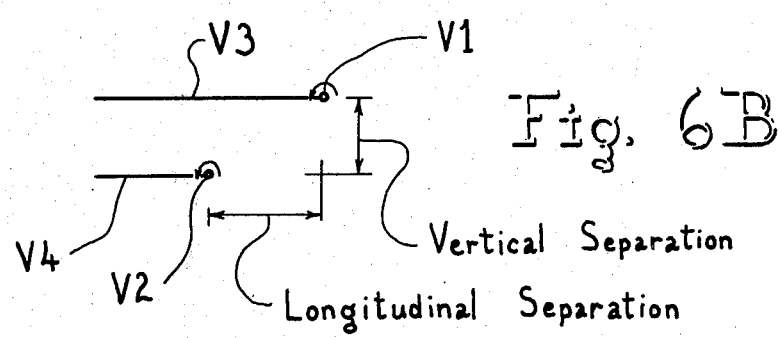
Figure 6C:
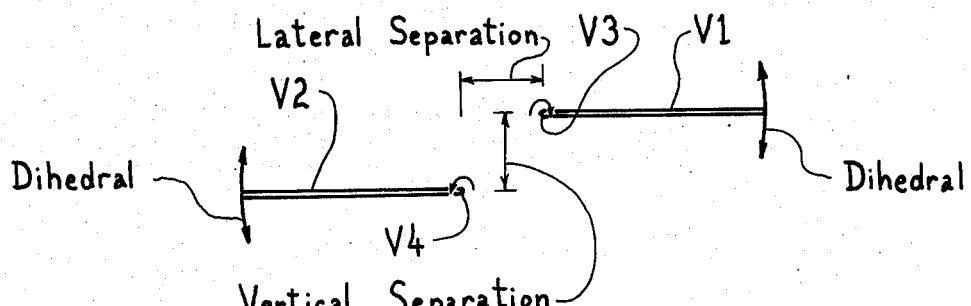

It might be noted that the vortex generating means of any of the embodiments disclosed herein may be oriented as desired in the flows as long as vortices are generated in the required manner, that is, vortices are generated which trail from the vortex generators in substantially time invariant flow patterns. The orientation may be such as to correspond to a sweep (meaningless in context with the embodiment of FIG. 4) and/or dihedral-like positioning (upwardly or downwardly inclined along the span of the vortex generating means, the span being perpendicular to the direction of flow and lying in the vortex generator). FIGS. 6A, 6B and 6C indicate the possible variations of sweep, dihedral and lateral, vertical and longitudinal separation. (Transverse to flow separation is the magnitude of the vector sum of the lateral and vertical separation).

The vortex generating means in the first and second flows need not be of the same kind. Thus, an airfoil might be used in one flow in association with a Magnus Effect cylinder or helicopter type rotor or multi-element airfoil or any suitable vortex generating means in the other flow. As a generalization, any one vortex generating means may be used in association with any other vortex generating means there being a vortex generating means in each of the two flows. As a further generalization a given vortex generating means may comprise one or several of any suitable vortex generating means. Vortex generators may be used in parallel or tandem arrangements or combinations of parallel and tandem arrangements as may multiple embodiments of the present invention. The important consideration in placing the vortex generators is that the desired vortical flow patterns be induced in the flows thereby transferring energy into and from vortically associated energy. A given embodiment according to the present invention may have one, several or many flow regions where such energy transfer takes place.

Figure 7:
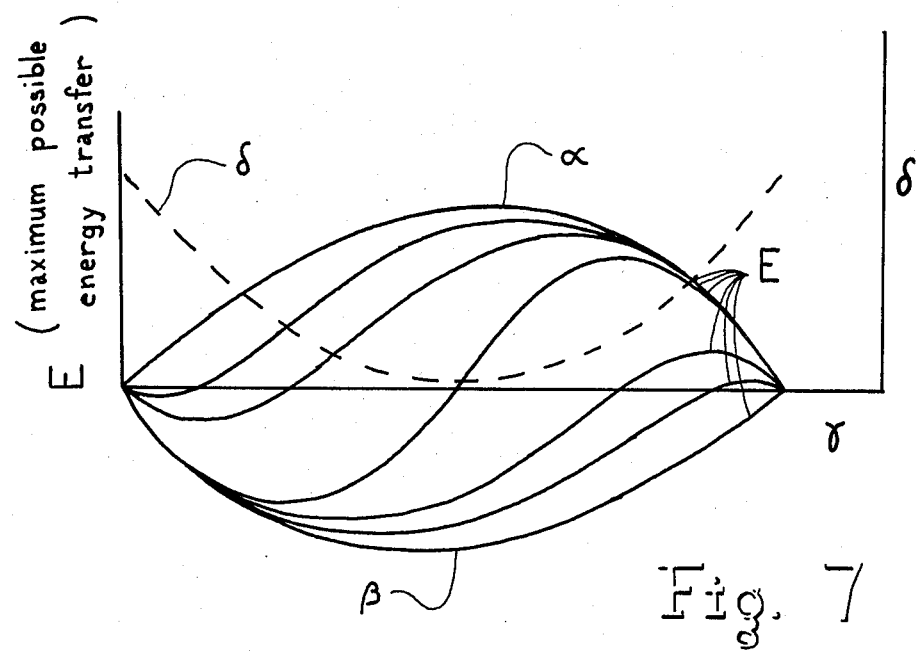
FIGS. 7 and 8 are graphic representations of energy transfer efficiency related to vortex generator position.

Since pressure disturbances communicated from a first fluid flow to a second fluid flow (and possibly in the reverse direction) are the mechanism of energy transfer, actual mass interchange (mixing between the flows involved in the energy transfer) may be minimal especially as the trailing vorticity is minimized (FIG. 7, curve $\delta$). The fluids in the flows involved in the energy transfer may or may not be the same fluid and thus the properties of the fluids of the flows may be the same or different. If the fluids are different, the fluids may or may not be miscible in each other. References to certain vortex generators as airfoils should not be considered to imply that the fluids must be gaseous but they may be liquid (or even conceivably a mixture of gas and liquid).

The angle of attack of airfoils, the rotational speed of Magnus Effect cylinders, etc., are chosen so that the desired vorticity is generated within the flows involved in the energy transfer. Airfoil 12, cylinder 22, rotor 32 and multi-element airfoil 42 are shown in the FIGS. 2 through 5 as being generally downstream of the respective elements 11, 21, 31 and 41; such placement is not necessary. Placement of elements 12, 22, 32 and 42 is based on design requirements but should usually, for optimal energy transfer, be (1) in the region of flows 14, 24, 34 and 44 respectively where the vortically induced transverse-to-freestream flow velocity is greatest, (2) the non-vortically associated velocity is least decreased and (3) near to elements 11, 21, 31 or 41 so that the vortex which extends generally between the two vortex generating means in any given embodiment is quickly cancelled downstream of the vortex generators to thereby minimize flow mixing. The FIGS. 2 through 5 show embodiments which are believed to be in accordance with these principles. These principles hold for any two vortex generators arranged and used according to the two vortex generator embodiments of the present invention. There are similar principles which hold for embodiments using more than two vortex generators, these similar principles being outlined hereinbelow.

FIGS. 6A, 6B and 6C are perspective, side and end views respectively schematically showing the vortex equivalent of the embodiments of FIGS. 2 through 5 and indicate the possible variations in orientation and placement of the vortex generators of these embodiments. The vortex generators are not shown directly but rather the filaments of the vortices bound thereto are shown and indicated by lines V1 and V2. Lines V3 and V4 are the filaments of the vortices trailed from the adjacent ends of the vortices V1 and V2 respectively. Any dihedral or sweep angles or any of the vertical, lateral or longitudinal separations may be positive or negative. Negative longitudinal separation corresponds to V2 being upstream of V1. Negative lateral separation corresponds to lateral overlapping of V1 and V2. For purposes of the present specification, longitudinal separation is considered to be positive when V1 is upstream of V2 and negative when V1 is downstream of V2.

Figure 9:
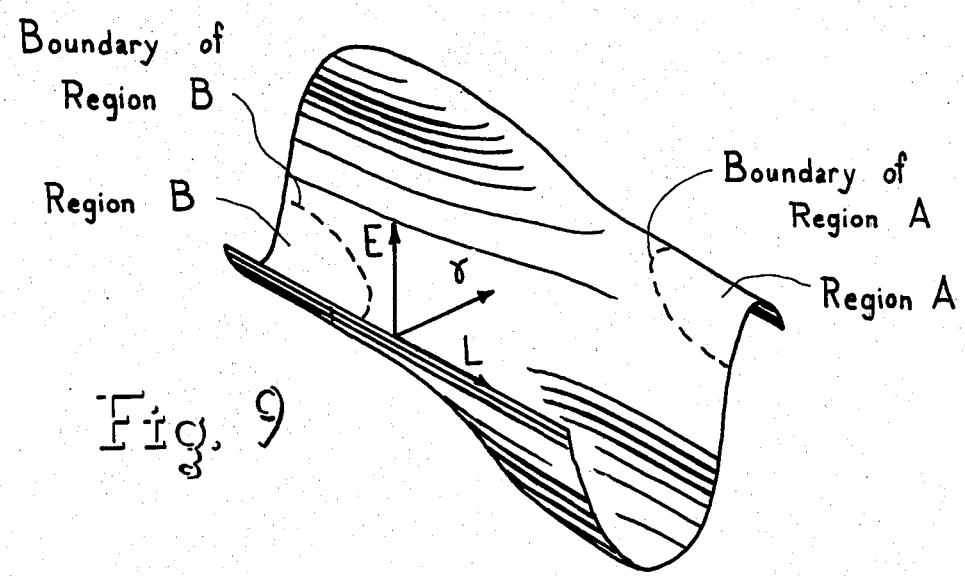
FIGS. 9 and 10 are a three dimensional surface and graphic representation depicting the energy transfer coefficient E.
Figure 10:
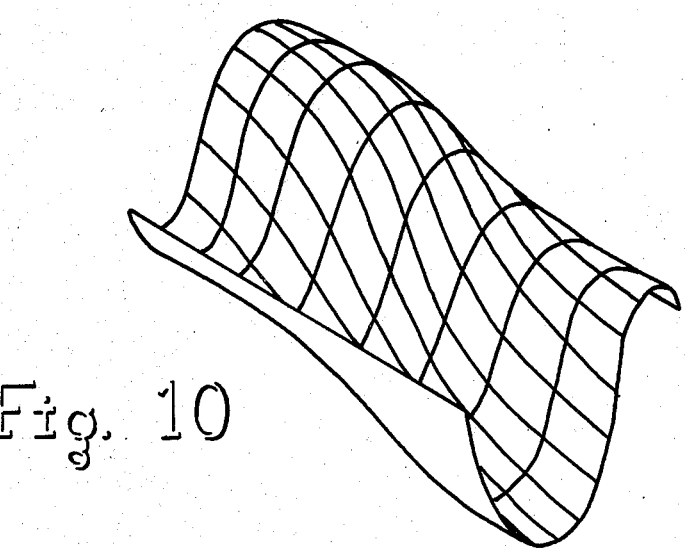

FIGS. 7, 9 and 10 show graphs and three dimensional surfaces and all three portray the same information. The solid line curves of FIG. 7 correspond to particular profiles taken at particular values of L on the surfaces of FIGS. 9 and 10 and show values for the energy transfer coefficient E as a function of $\gamma$ where $\gamma = \Gamma_2/\Gamma_1 + \Gamma_2$.

$\Gamma_1$ and $\Gamma_2$ equal the strengths of the two vortices generated by the vortex generators such as vortex generators V1 and V2 in FIGS. 6A, 6B and 6C. L is the longitudinal separation of the vortex generators such as is shown in FIGS. 6A, 6B and 6C. The effect of transverse to flow separation (equal to the magnitude of the vector sum of the vertical and lateral separations) is not shown directly but is indicated by FIG. 8 where the concentration of the two trailed vortices decreases as the transverse to flow separation increases. FIG. 9 shows E as a function of L and $\gamma$ and is shown by means of a three dimensional surface: FIG. 10 is another drawing of the same surface but using a different method of portraying the same surface. The various curved lines which make up the drawing represent profiles of the surface taken along lines of constant L and constant $\gamma$.

These various graphs indicate trends only and are not meant to give precise design information. Experimentally derived data obtained by tests made using real vortex generators should result in similar curves with the precise shape depending on chordwise vorticity distribution and spanwise vorticity distribution.

The curves in FIG. 7 and the surfaces shown in FIGS. 9 and 10 may be extended beyond the limits of $\gamma$ shown but the shape of this portion of the curves and the surface is unknown to me except that the curves and their derivatives should be continuous. This figure indicates the range of possible longitudinal positioning of the vortex generators. $\Gamma$ varies (for fixed flow conditions) with relative differences in angles of attack, airfoil section, profile, rotational speed, etc. between the two vortex generators (such as angle of attack and airfoil section).

As may be seen from a study of the curves of FIG. 7 and from FIGS. 9 and 10, there are limiting values or curves (FIG. 7, curves $\alpha$ and $\beta$) which are approached asymptotically as L becomes large in absolute value.

Curve $\delta$ in FIG. 7 indicates the relation between $\gamma$ and the vortically associated energy of the output flow or, if there is vortically associated energy in the incoming flow, the change in vortically associated energy as a function of $\gamma$. $\delta$ is also an energy coefficient.

FIG. 8 indicates the relation between vortex dispersion D and P, the percentage of maximum possible energy transfer which is actually obtained. P and $\epsilon$, which is an energy coefficient (somewhat analogous to curve $\delta$ in FIG. 7) indicates output vortically associated energy. I do not have a precise definition for D but I believe that a satisfactory approximating function for D is to be found below.

In a plane downstream of an energy transfer device according to the present invention where said plane is roughly perpendicular to the flow having a local vorticity $\Gamma$ which is a function of ordinates x and y in the plane, then $$\bar{x} = \int_{-\infty}^{+\infty} x\,\Gamma(x,y)\,dx/\Gamma_{total} \quad \bar{y} = \int_{-\infty}^{+\infty} y\,\Gamma(x,y)\,dy/\Gamma_{total}$$

$$\Gamma_{total} = \int\int_{-\infty}^{+\infty} \Gamma(x,y)d_x\,d_y$$

$$D = \int\int_{-\infty}^{+\infty} [(y-\bar{y})^2 + (x-\bar{x})^2]\Gamma(x,y)d_x\,d_y/\Gamma_{total}$$

Curve $\epsilon$ in FIG. 8 is shown as being roughly parabolic about D=O; the proper curve is generally monotonically increasing as D increases.

Upon obtaining experimentally derived curves and surfaces, the energy transferred and "lost" vortically associated energy may be determined from:

Energy Transferred is proportional to E×(P)
Energy Lost is proportional to $\delta + \epsilon$ I do not know of any other important factors than these stated above (except possibly viscous effects).

A prior art compressor and turbine system is illustrated in FIG. 11 along with a representation of a functional equivalent created by the instant invention. The turbine 50 extracts energy from flow 1 and transfers the energy via drive shaft means 51 and the compressor 52 to the flow 2. Identical functions are accomplished using the instant invention where energy from flow 1 is transferred by means of vortex generators 3 and 4 to the flow 2.

The method of transferring energy by a vortex generator may also be used to create thrust augmentation systems for jet engines such as illustrated in FIG. 12. In this illustration, the high energy exhaust flow 61 and low energy flow 62 experience an energy transfer which effectively increases the diameter of the exhaust core flow. In this embodiment of the instant invention, energy is transferred from the high energy flow 61 to the low energy flow 62 to create the increased core diameter and resultant increased thrust.

FIG. 14 illustrates another embodiment of the instant invention which results in a jet engine having no moving parts. FIG. 13 presents the equivalent conventional jet engine with equivalent sections annotated with reference designation identical to those used in FIG. 14. The various elements are the diffuser 71, the compressor 72, the turbine 73, the combustor section 76 and the nozzle 79. In the engine shown in FIG. 14, conduit 80 has air drawn therethrough by the turbine 73 thus supplying energy to the compressor 72. Vortex generators 75 extract the vortical energy taken from the flow passing vortex generators 74 and entering conduit 80. The air energized by the action of vortex generators 75 on the flow passing thereover then enters the combustor section 76. Vortex generators 77 extract energy from the energized exhaust as it leaves the combustor section 76 while vortex generators 78 convert the vortical energy into non-vortically associated energy thereby energizing the flow passing thereover and drawing air through conduit 80. It may be necessary to provide a fan or other means (not shown) to force air through the engine shown in FIG. 14 so that it may be started. Once started, this engine will continue to operate after shutdown or physical removal of such auxiliary air forcing means. A turbine may be used to yield a mechanical work output, or conduit 80 may be used as a vacuum source for a motor. Flow guide vanes are not shown but may be provided.

Figure 15:
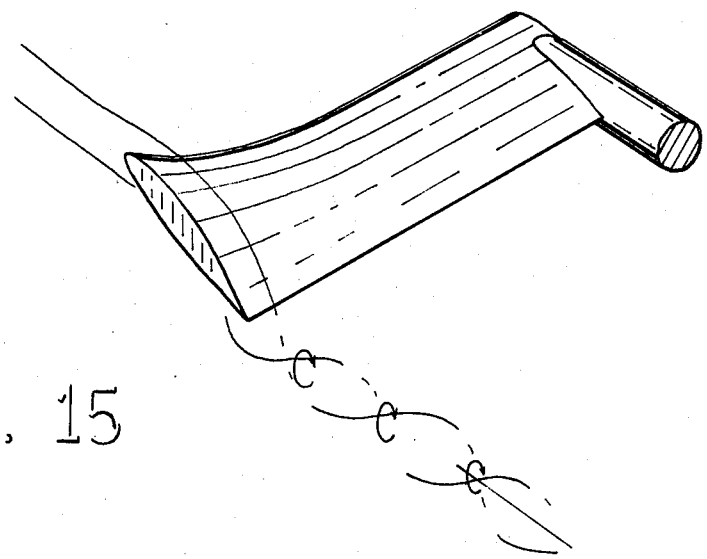
FIGS. 15 and 16 are perspective and end views of an idealized airfoil for use in the instant invention.
Figure 16:
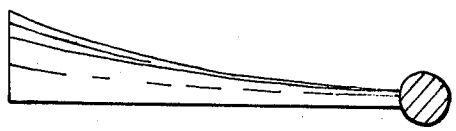

The preceding discussion has been limited to various aspects of embodiments of the present invention which may use only two vortex generators or, as indicated in FIGS. 12, 13 and 14, more vortex generators in each energy transfer group. As a practical matter, a real vortex generator such as an airfoil generates a vortex sheet which may be approximated by one, several or many trailed vortices. It is desirable to use vortex generators in embodiments of the present invention which approximate a single vortex generator as much as is possible, that is, vortex generators which generate a flow pattern as close as possible to that generated by a single vortex generator. Thus, the airfoils shown in FIG. 2 are illustrative and the shapes shown would probably produce a trailed flow pattern best modeled by using a vortex sheet or, somewhat less accurately, several vortices. The flap 81 and the slat 82 shown mounted on the airfoils 41 and 42 respectively in FIG. 5 are shown as being near to the tip of the associated airfoils so that the trailed vorticity is more closely concentrated at the tip. In any case, the spanwise position of the flap or slat does not affect the principle of operation but only the efficiency obtained. FIG. 8 indicates generally the influence of vortex concentration on energy transfer. FIGS. 15 and 16 are perspective and end views of an airfoil shaped to maximize the concentration of the generated vorticity. It will be understood that the airfoils shown are such that they have large induced drag and concentrated trailed vorticity.

DESIGN PRINCIPLES FOR EMBODIMENTS USING THREE OR MORE VORTEX GENERATORS

Embodiments of the present invention may use more than two vortex generators in obtaining energy transfer. Unfortunately, it is difficult to draw surfaces corresponding to FIGS. 9 and 10 or curves corresponding to the curves of FIG. 7, that is, graphs showing energy transfer as a function of longitudinal separation or relative vortical strengths, for embodiments using three vortex generators or more. Some intuitively based principles which may be used to guide one in arranging the vortex generators are needed and must be given before I may consider myself to have made a full and complete disclosure. It should be noted that the intuitive means described below does not allow prediction nor suggest all of the possible arrangements of vortex generators which result in energy transfer. For example, the two vortex generator energy transfer arrangements corresponding to the regions A and B on the energy transfer surface graph of FIG. 9 are not intuitively obvious nor are the regions exterior to the graphed area and perpendicular to the L ordinate. Similar situations exist with three or more vortex generator energy transfer embodiments with the corresponding flow systems having a highly vortical flow trailed from the region of the flow where energy transfer takes place. However, the energy transfer of such flow systems is relatively small in comparison to the energy associated with vorticity and thus of little interest (unless a vortically associated energized flow output is desired).

Figure 17:
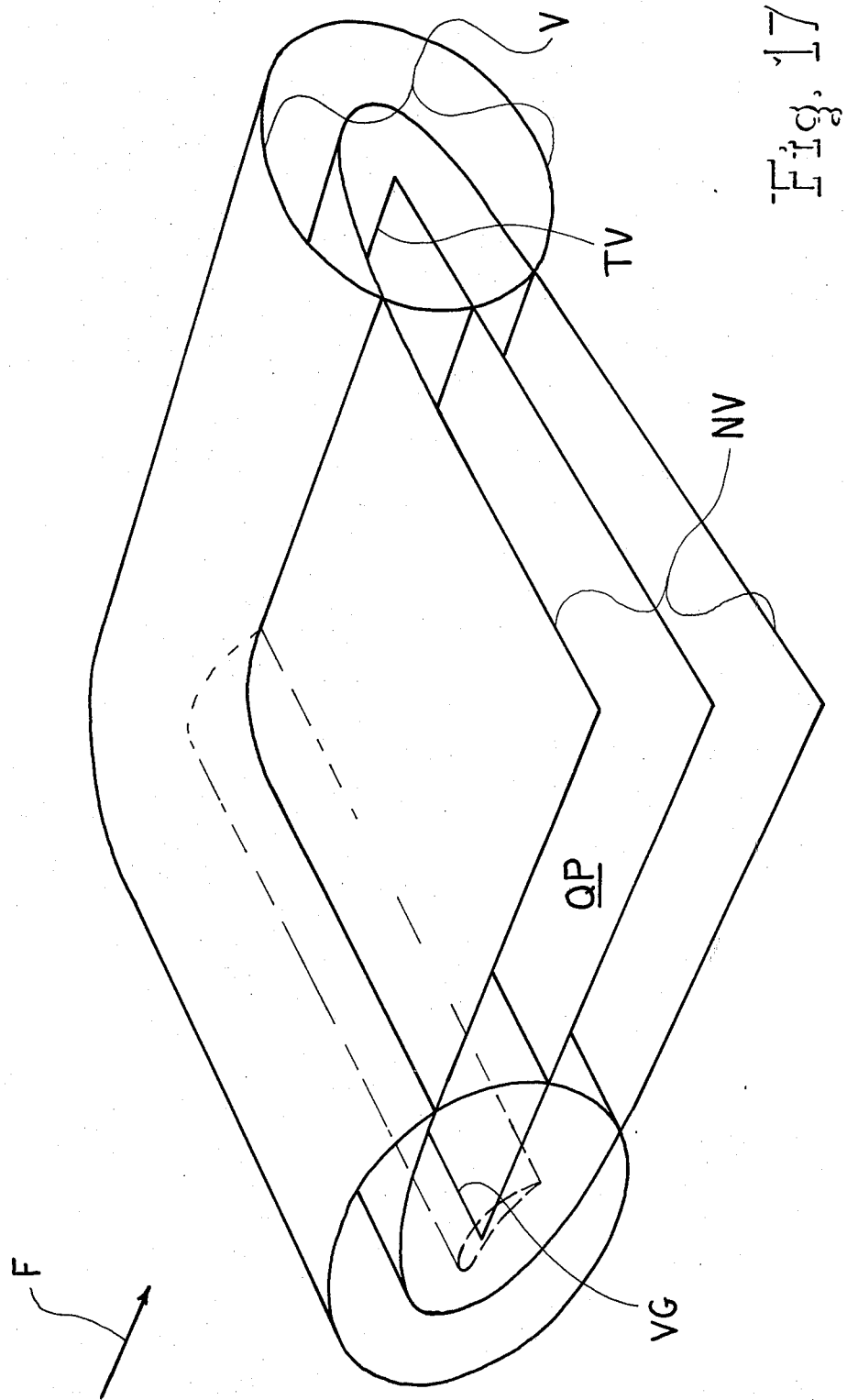
FIG. 17 graphically illustrates the energy regions of vortex flow about a vortex generator.

FIG. 17 schematically shows certain geometrical shapes sectioned by two perpendicular planes where the shapes represent a vortex generator trailing a trailed vortex TV and a quarter plane QP which is bounded by the vortex generator and the trailed vortex TV and which is downstream of the vortex generator VG. There are two regions in the flow where the first region NV is defined as being that portion of the flow where the change in the non-vortically associated specific energy is greater than a certain value and the second region V is that portion of the flow where the change in the vortically associated specific energy is above a second certain value. The shape and location of the first region is roughly like the shape and location of a region which includes all points in the flow which are within a given distance of the quarter plane QP. The shape and location of the second region is roughly like the shape and location of a region which includes all points in the flow which are within a second distance from either the trailed vortex TV or the vortex generator VG (and thus generally has a "V" shape).

As a general statement, a vortex generator in a flow F such as is shown in FIG. 17 may in effect transfer energy between regions NV and V but only energy of the appropriate form. That is, region NV is associated with non-vortically associated energy changes while region V is associated with vortically associated energy changes. As a further observation, there must be vortically associated energy in the oncoming flow F which enters region NV if vortically associated energy is to be available to be transferred from region NV to region V.

It should now be a fairly simple matter to arrange multiple vortex generators to obtain a desired energy transfer. Mixing is a function of vortex strength and vortex length and varies roughly as the product of strength and length. Vorticity is necessary for energy transfer using the present invention but the vortex length may be adjusted by changing the longitudinal separation of the vortex generators. Such position changes will affect the energy transfer obtained in a manner which does not contradict results indicated in FIGS. 7, 8, 9 and 10 but which are not readily predicted from these Figures for embodiments having three or more vortex generators.

FIGS. 18 through 33 show paired perspective and side views which indicate various exemplary energy transfer embodiments using airfoil vortex generators where the intake and exhaust planes and energy profiles therein are indicated. Support means for vortex generators are not shown. In these Figures, LE and HE indicate relatively low and high non-vortically associated energy regions respectively while VE indicates a region of high vortically associated energy. In each example in FIGS. 18 through 31, there is negligible change of flow vorticity between input and exhaust, thus flow conditions corresponding to those corresponding to regions A and B are precluded (note FIG. 7, curve δ relative to vortically associated energy in the output). FIGS. 32 and 33 show one example corresponding to region A (or B) with a net change in vorticity obtained (negligible input vorticity and appreciable output vorticity). The vortical nature of the output or exhaust flow will cause relatively rapid mixing and homogenization of the output flow further downstream unless some means such as a wall is interposed between the downstream flows.

Using the above disclosed intuitive means, it becomes possible to construct (essentially by superposition of flow patterns desired thus dictating the positioning of the vortex generators) apparatus to effect an energy transfer as required in a given situation. Note might be made of the example of FIGS. 24 and 25 where the two vortex generators cancel each other so that there is no net energy transfer obtained as measured at the exhaust plane. The example shown in FIGS. 20 and 21 is similar to the energy transfer device used as a compressor in the engine shown in FIG. 14 and the thrust augmentor shown in FIG. 12 while the device shown in FIGS. 26 and 27 is similar to the turbine in the engine shown in FIG. 14. In these devices, the number of vortex generators used to put or take vortically associated energy into or from a flow is not critical, four such vortex generators in each functional group of vortex generators being shown in FIGS. 20, 21 and 26 and 27.

It is possible to use the output of one embodiment of the present invention as the input to yet another embodiment thus obtaining multiple stage energy transfer. It is not necessary to pair vortex generators. Thus, two or more vortex generators in one flow may transfer energy in conjunction with one or more vortex generators in the other flow.

In the embodiment of FIG. 14, I do not wish to be limited to the use of a fluid in the engine which may support combustion (air, oxygen, etc.). Rather, any fluid which may be compressed, heated by any means including combustion and then expanded in a turbine thereby deriving a work output above that used in compressing the fluid may also be used.

Figure 34:
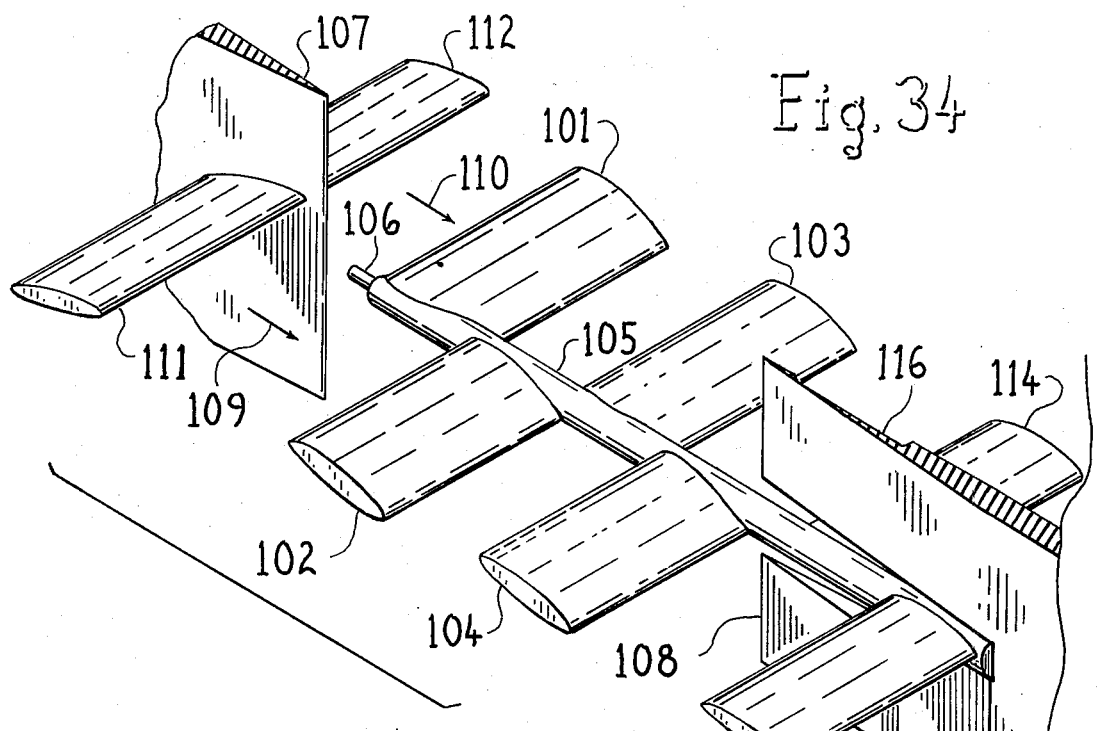
FIG. 34 shows in perspective one arrangement of deployable vortex generators and guide vanes.

In FIG. 34, airfoils 101, 102, 103 and 104 serve as first, second, third and fourth vortex generators while 105 is a sleeve on which airfoils 101 through 104 are mounted. Sleeve 105 is mounted on rod 106 so that it may pivot thereon. Arrows 109 and 110 indicate a possible set of flow velocities. A means for converting work to or from flow energy are not shown.

Flow separating means 107 and 108 are positioned up and downstream respectively of the airfoils 101 through 104, the sleeve 105 and the rod 106. Rod 106 may be supported by neither, either or both of the flow separating means 107 and 108 and is illustrated as supported by separating means 108. FIG. 34 shows one possible positioning of the various elements allowing the airfoils 101 through 104 to be pivoted with sleeve 105 and on rod 106 between a position where the airfoils are essentially in the plane of the separating means 107 and 108 or pivoted to a position perpendicular to the plane defined generally by 107 and 108 (shown in FIG. 34) or to any desirable intermediate angle. As may be seen, the airfoils are shielded when in the in-plane position so that little or no energy transfer occurs while energy transfer occurs to a degree which varies with position (even without the pivot axis angling disclosed below). Sleeve 105 tends to decrease the energy transfer by interfering with the vorticity but the interference may be minimized as by minimizing the size of sleeve 105 and properly shaping the sleeve.

Airfoils 111, 112, 113 and 114 serve as flow guiding vanes and any or all may be mounted to be fixed (as airfoils 111 and 112) or deployable (as airfoils 113 and 114) and are provided if desired or needed to obtain required flow conditions. Recesses as 115 and 116 may be provided to receive the deployable vanes 113 and 114 if desired. The flow separating means 107 and 108 are of indeterminate vertical extent and sized and shaped as needed. Multiples of vanes may be employed (as two vanes replacing vanes 111, 112, 113 and 114) and they may be provided with "lift" modifying means. The angles of attack shown are intended only to indicate that the airfoils may be angled as required. The flow direction need not be in the direction indicated by arrows 109 and 110.

Either of the flow separating means 107 and 108 may be deleted if it is not needed for preventing flow mixing (due to near equivalence of fluid energies of otherwise adjacent flows) or is otherwise not desired. Airfoils 101 through 104 represent two vortex energy transfer stages comprised of pairs 101 and 102 and 103 and 104 (though obviously each influences the flow around all of the others) sharing common flow separating means. Either airfoil set 101 and 102 or set 103 and 104 may be deleted to make a single stage device or additional stages may be provided. The vortices trailed from the airfoil tips adjacent to sleeve 105 are of primary concern relative to the vortex energy transfer (though the effects due to the opposite airfoil tips may have to be considered).

Figure 35:
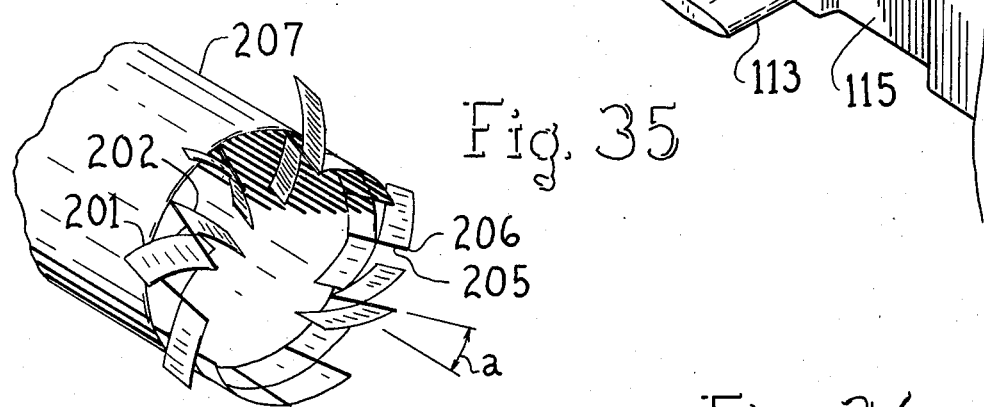
FIG. 35 shows in perspective a modification of the arrangement of FIG. 34 adapted for use with a closed cylindrical conduit.

FIG. 35 shows an additional embodiment where the airfoils as 201 and 202 are so positioned on their sleeves as 205 and adjacent rods as 206 and so positioned relative to each other that the airfoils may interfit when they are in their retracted positions. Relative streamwise or longitudinal separation of airfoils in a given vortex energy transfer stage may vary as suggested below in connection with sweep angle mounting of airfoils on their sleeves. Further, the airfoils are curved along their spans to accommodate a curved flow separating means which is shown joined with adjacent like flow separating means to form a cylinder 207. As may be seen, the airfoils in the non-energy transfer or "non-operative" position serve to extend the flow separating means 207 in this particular embodiment.

The embodiment of FIG. 34 may be modified by angling the rod or pivot axis so that the airfoils have negligible angles of attack when they are in the "non-operative" positions but have an increase in angle of attack as the airfoils pivot to their operative positions. The embodiment of FIG. 35 incorporates this concept as indicated by the angle a. The angled pivot axis need not lie in an extension of the local tangent plane of the separating means. Means to lock and/or drivingly pivot the airfoils are not shown but may be provided. Means interconnecting the pivoting sleeves may be provided if desired. FIG. 35 shows the various sleeve mounted airfoils rotated to differing degrees to help illustrate the various positions that they may be placed in. The airfoils may be rotatable about their pivot axes through a full 360° if need be. It is further possible to orient the pivot axis so that the angle of attack decreases from a maximum as the airfoils are deployed from a stowed position or reaches a maximum pitch or attack angle at an intermediate position.

Figure 36:
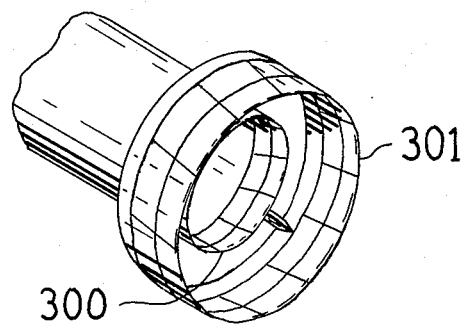
FIG. 36 shows in perspective an embodiment like that of FIG. 35 but showing the use of two stages of deployable vortex generators used in energy transfer.

FIG. 36 discloses an arrangement comprised of two stages 300 and 301 both like that of FIG. 34 with the stages having both radial and axial positioning of one stage relative to the other. The radial and axial positioning may be varied as desired; the axial positioning may be adjustable.

Figure 37:
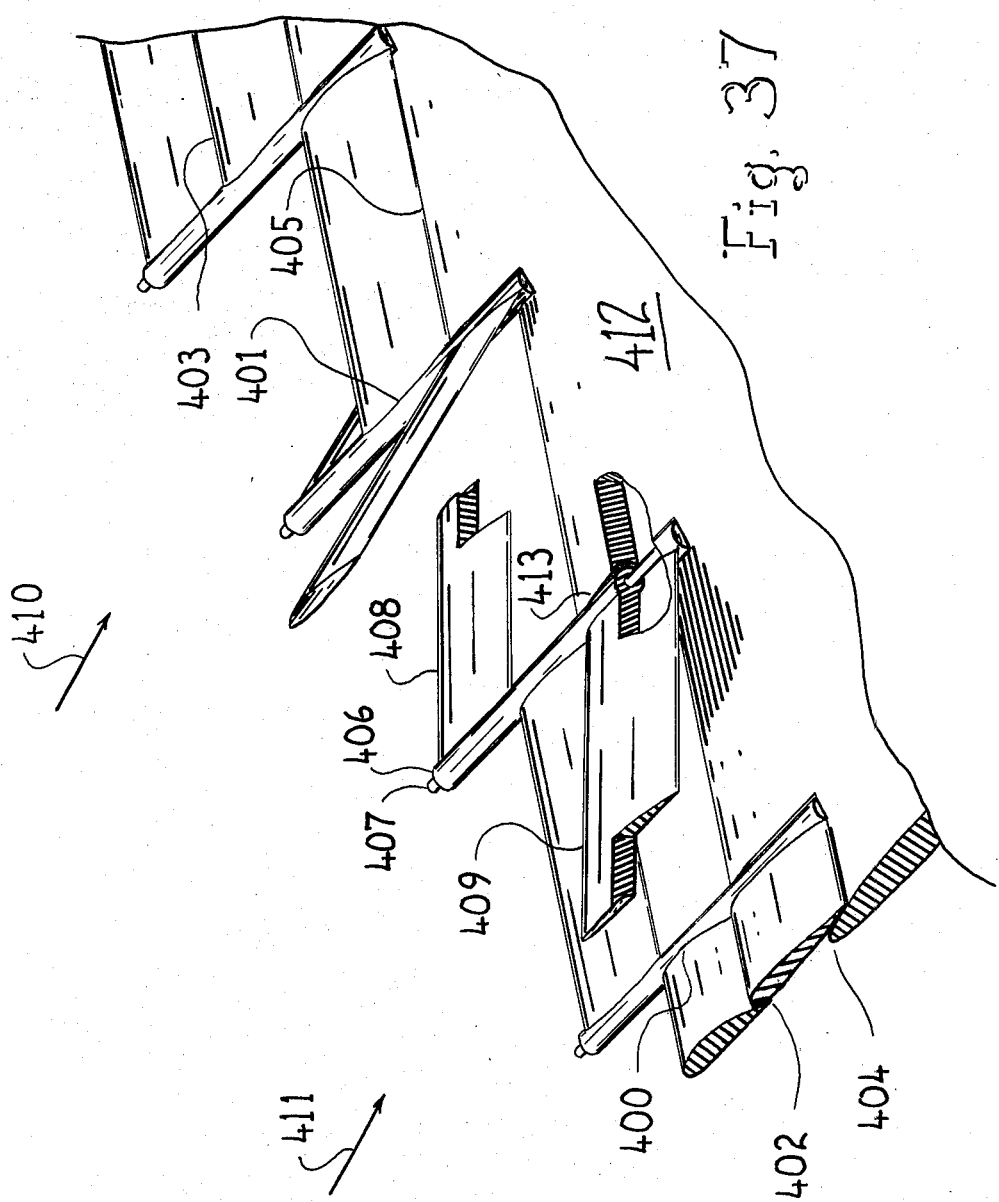
FIG. 37 shows in perspective one arrangement where the airfoils may be well interfitted when in their stowed positions.

An angled pivot axis results in a change of sweep of the airfoils as they pivot and the separating means may be given a sawtooth edge should it be so desired in connection with allowing for said sweep changes or in allowing sweep angle mounting of the airfoils. FIG. 37 illustrates one embodiment (with several elements sectioned) where the airfoils are shaped and mounted to 1) fit against support sleeves for adjacent airfoils as at 400 and 401, 2) overlap each other (leading edge over trailing edge) as at 402 and 403 and 3) overlap the sawtoothed edge of the flow separating means 412 as at 404 and 405. None, any one, two or all of these features may be employed in any combination desired. Sweep angle mounting variation of the airfoils on their sleeves may be used to allow variation in the streamwise separation of vortex energy transfer airfoil pairs. The airfoil tips as at 400 and 401 may be shaped to fit against adjacent sleeves. 406 represents a sleeve on rod 407 with airfoils 408 and 409 mounted on sleeve 406. Arrows 410 and 411 indicate fluid flow. 412 is a flow separating means: clearance is provided between sleeve 406 and separating means 412 at gap 413.

Embodiments made in accordance with the present invention may be used in thrust augmentors, compressors, turbines and the like and wherever vortex energy transfer devices may be used.

Any suitable means may be used to allow the desired pivoting action of the airfoils. Thus, airfoils might be mounted on a rod which in turn is supported by bearings or the like. The orientation and position of the pivot axis may be set as necessary (within vortex energy transfer operating limits) to meet requirements of a given mechanical layout.

FIG. 38 shows an embodiment similar to that of FIG. 35 but using deployable "U" shaped vortex generators 500, 501, 502 and 503 while FIG. 39 schematically shows an end view of the same embodiment. Both FIGS. 38 and 39 show the vortex generators stowed, (500), deployed (503) and in intermediate positions (501 and 502). The fixed vortex generators 504 may be supported from both ends, cantilever supported from one end, the middle, etc. The direction of rotation of the vortex generators 500 through 503 upon deployment may be in either direction as desired. 505 is a cylinder which serves as a flow separation means.

FIG. 40 shows an arrangement of various known devices where a work input or output is derived from a change in stagnation pressure of a fluid passing therethrough where a vortex energy transfer device is used in conjunction with such devices. Valves 130 and 131 used in conjunction with passages 132, 133, 134, 135, 136, 137 and 138 leading to blower/centrigufal turbine 140 and open air intake/exhaust nozzle 141 (neither being devices which convert fluid flow energy into or from work) and compressors/turbines 142 and 144 and turbine/compressor 143 illustrate some of the variations possible (which device in each pair is to be used depends on the direction of flow). A pump, motor and the like are additional such devices. Note should be made of the flow separating means 145 shown as being between (in a streamwise sense) the vortex energy transfer airfoils 146 and 147 and the devices converting fluid flow energy to or from work as 140, 142, 143 and 144 and the device 141. The passages 134, 138 and 139 are shaped to suitably direct flow toward and receive flow from the region of vortex energy transfer. 145 is cut away at 148 to help illustrate this. 149 is an opening in 145.

Any angle of attack device (having "lift" as a function of angle of attack or pitch) may use angle pivot support means to allow a variation in vortex energy transfer due to both depth of penetration of the vortex generators into the flows and variation in strength of the generated vortices.

Figure 41:
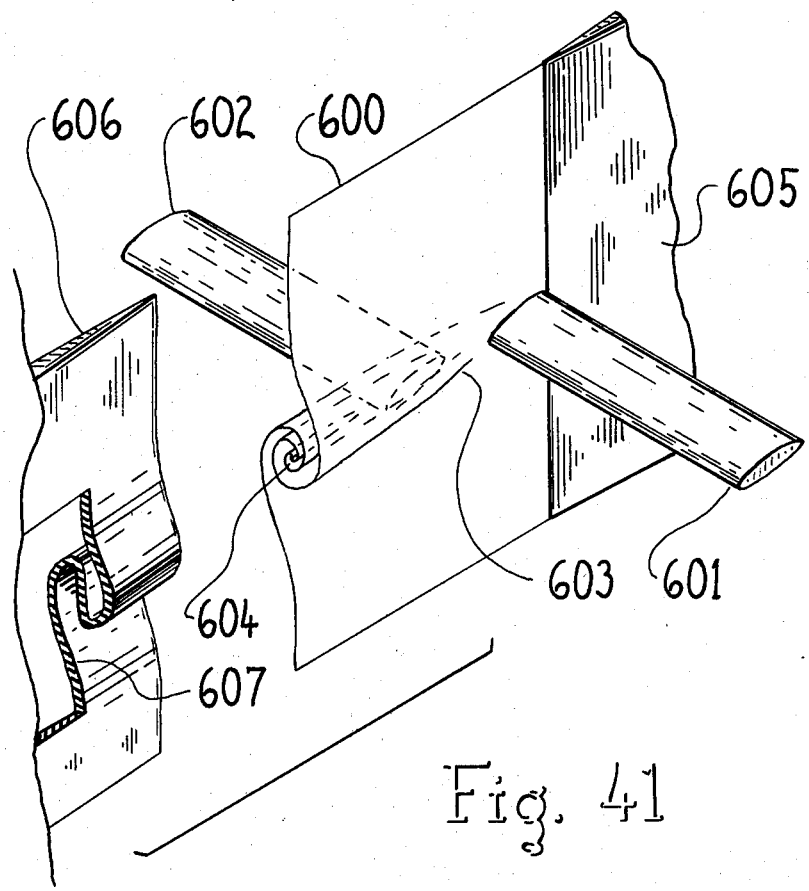
FIG. 41 shows a flow pattern with yet another method of portrayal indicating the lateral displacement of the boundary between flow streams.

FIG. 41 shows the shape of the free surface 600 between the flows in one embodiment. Even though airfoil 602 exactly cancels the vorticity trailed by airfoil 601, the free surface will remain "wound" as shown in cutaway at 604: "wind-up" action in this case will only occur in the region 603 between the airfoils 601 and 602. Wall 606 is convoluted somewhat as may be seen in the section of the wall 607 to match to some extent the convoluted shape of the free surface as a means to minimize mixing between the flows. Wall 605 may be convoluted if desired. It might be noted that viscous mixing per unit mass of flow will be maximum at the center of the wound-up vortex due to the high shear gradients present (related to free surface area per unit volume).

It should be further noted that some of the airfoils shown in various Figures do not have a readily identifiable trailing edge. It should be realized that, since the underlying principle causing energy transfer is reversible, it is immaterial in these Figures which direction the flows travel. The airfoils will of course be oriented properly (leading and trailing edge) in accordance with known teachings once the direction of flow in a given embodiment is decided upon.

A flow separating means such as a wall has streamlines passing to either side thereof. The energy transfer takes place across the free surface between the flows (as 600 in FIG. 41) which surface corresponds to the streamlines originating or ending (meeting) the lip or edge of the flow separating means. Thus, the two vortex generators lateral-most extents (e.g., tips) involved in the energy transfer will be positioned essentially in the free surface (with the second vortex generator within the convolution of the free surface) with the vortex generators projecting one from each side of the free surface plane (the plane defined generally as being congruent with the free surface exclusive of the convoluted portion). I do not wish to be limited to this precise positioning of the lateralmost extents relative to the free surface. FIG. 41 illustrates the deformation of the free surface involved in vortex energy transfer.

Guide vanes may be provided with any of the embodiments disclosed herein. The vanes may be fixed or deployable in phase, out of phase, at a different deployment rate, etc. with the vortex generators. A given aerodynamic surface may serve both as a guide vane and vortex generator if a portion of the tip is free of flow separating means, that is, extends beyond a boundary of a flow separating means into the free flow (past the edge of a wall). The vortex generators may likewise be deployable together in phase, out of phase, etc.

Boundary layer effects are undesirable to the efficient operation of embodiments of the present invention and the elements should generally be sized relative to whatever boundary layers are formed so that energy transfer efficiency is maximized.

Where airfoils are used as the vortex generating means, the airfoils should have their chords (as indicated by airfoil sections) with the leading edges and trailing edges thereof oriented to be generally aligned with the direction of flow.

Except in discussing FIG. 14 (in which embodiment energy as heat is added to a fluid stream) references hereinabove to energy of a flow are intended to indicate that energy having a correspondence to stagnation pressure.

Viscous shear between flows will always tend to irreversibly transfer energy from a high energy flow to a low energy flow with which it is in contact even though energy is being transferred from the low energy flow to the high energy flow by the reversible process underlying the operation of the present invention. These reversible and irreversible processes will be additive in their effects when energy is to be transferred from a high energy flow to a low energy flow. The energy transferred by the reversible process will have to be greater than the energy transferred by the irreversible process if a net energy transfer from a low energy flow to a high energy flow is to be obtained since the processes in this case are substractive.

While preferred embodiments of this invention have been illustrated and described, variations and modifications may be apparent to those skilled in the art. Therefore, I do not wish to be limited thereto and ask that the scope and breadth of this invention be determined from the claims which follow rather than the above description.

What I claim is:

1. An apparatus for transferring energy from a first fluid flow to a second fluid flow, comprising: a flow separating means having first and second sides and having said first fluid flow on said first side thereof and said second fluid flow on said second side thereof; said flow separating means dimensioned so that said first and second fluid flows are in contact with each other through a mutual free surface; a first vortex generator means supported within said first fluid flow and having a vortex trailing lateral-most extent extending toward said free surface; a second vortex generator means supported within said second fluid flow and having a vortex trailing lateral-most extent extending toward said free surface; and means which transfers energy between work energy and fluid flow energy where the fluid flow involved in the energy transfer of said means is one of said first and second fluid flows and at most only some of the other flow.

2. An apparatus as defined in claim 1 where said first vortex generator means is rigidly supported relative to said flow separating means.

3. An apparatus as defined in claim 1 where said first vortex generator and said second vortex generator are supported so that they may be moved simultaneously in position relative to said flow separating means where there is a fixed relationship of movement of said first vortex generator relative to said second vortex generator.

4. An apparatus as defined in claim 1 where at least one of said vortex generators is provided with actuator means which causes movement of said vortex generator relative to said flow separating means.

5. An apparatus as defined in claim 1 where at least one of said vortex generators may be moved in flowwise position relative to said flow separating means.

6. An apparatus as defined in claim 1 where said means which transfers energy between work energy and fluid flow energy is associated with a reaction motor and said flow separating means is comprised of the wall of the nozzle of said reaction motor.

7. An apparatus as defined in claim 1 where means is provided to cause the addition of thermal energy to the fluid flow having energy transferred thereto as a result of the interaction between said first and second fluid flow caused by said first and second vortex generator means.

8. An apparatus as defined in claim 7 where said flow stream having energy transferred thereto is caused to pass through a second apparatus comprised of: a second flow separating means having first and second sides and having said first fluid flow on said first side thereof and said second fluid flow on said second side thereof;

said second flow separating means dimensioned so that said first and said second fluid flow are in contact with each other through a mutual free surface;

a third vortex generator means supported to be within said first fluid flow and having a vortex trailing lateral-most extent extending toward said second free surface;

a fourth vortex generator means supported within said second fluid flow.

9. An apparatus as defined in claim 8 where said flow separating means and said second flow separating means include a continuous structure.

10. An apparatus as defined in claim 1 where at least one guide vane is provided which projects from the surface of one of said flow separating means into one of said fluid flows.

11. An apparatus as defined in claim 1 wherein said first vortex generator means comprises at least one vortex generating means projecting from the mutual free surface and said second vortex generating means comprises at least one vortex generating lateralmost extent extending toward the mutual free surface.

12. An apparatus as defined in claim 1 where said first and second vortex generators are rigidly supported one relative to the other.

13. An apparatus as defined in claim 12 where said first and second vortex generators are mounted for rotation between two positions.

14. An apparatus as defined in claim 1 where said first and second vortex generators have distinctly different flow-wise positions.

15. And apparatus as defined in claim 13 where said first vortex generator means is upstream of said second vortex generator means and where the energy transfer obtained as a result of the interaction between said first and second fluid flows is from the first fluid flow to the second fluid flow.

16. An apparatus as defined in claim 3 having third and fourth vortex generator means where said third and fourth vortex generator means are mounted for rotation between two positions where the axis of rotation of said first and second vortex generator means and the axis of rotation of said third and fourth vortex generator means are positioned so that one of said first and second vortex generator means and one of said third and fourth vortex generator means may nest against each other.

17. A method of transferring energy from a first fluid flow to a second fluid flow, comprising the steps of: passing said first fluid flow through a means which transfers energy between work energy and fluid flow energy while said first fluid flow is maintained separate from said second fluid flow; bringing said first and second fluid flows into contact so that they share a mutual free surface; generating a first trailed vorticity in said first fluid flow by means of a first vortex generator where the vortex filaments of said first trailed vorticity are concentrated and positioned near said mutual free surface where said first vortex filaments are approximately parallel to said mutual free surface; generating a second trailed vorticity by means of a second vortex generator where the vortex filaments of said second vorticity are concentrated and positioned near said mutual free surface and said filaments of said first vorticity, and where said second vortex filaments are approximately parallel to said mutual free surface; where said first vortex generator is in said first fluid flow and said second vortex generator is in said second fluid flow and where the flow region in the first fluid flow and the flow region in the second fluid flow between which regions energy is transferred are further from the mutual free surface than are the vortex filaments trailed by the vortex generator associated with the respective flow regions.

18. A method of transferring energy as defined in claim 17 further including the step of: altering said first fluid flow by a flow directing means provided between said means which transfers energy between work energy and fluid flow energy and said first vortex generator.

19. A method of transferring energy from a first fluid flow to a second fluid flow, comprising the steps of: generating first trailed vorticity in said first fluid flow by means of a first vortex generator where the vortex filaments of said first trailed vorticity are concentrated and positioned near the mutual free surface shared by said first and second fluid flows where said first vortex filaments are approximately parallel to said mutual free surface; generating a second trailed vorticity by means of a second vortex generator where the vortex filaments of said second vorticity are concentrated and positioned near said mutual free surface and said filaments of said first vorticity, and where said second vortex filaments are approximately parallel to said mutual free surface; where said first vortex generator is in said first fluid flow and said second vortex generator is in said second fluid flow and where the flow region in the first fluid flow and the flow region in the second fluid flow between which regions energy is transferred are further from the mutual free surface than are the vortex filaments trailed by the vortex generator associated with the respective flow regions; separating said first and second fluid flows approximately at said mutual free surface; and passing said first fluid flow through a means which transfers energy between work energy and fluid flow energy.

20. A method of transferring energy as defined in claim 19 further including the step of: altering said first fluid flow by a flow directing means provided between said means which transfers energy between work energy and fluid flow energy and said first vortex generator.

21. A method of transferring energy to a first fluid flow from a second fluid flow, comprising the steps of: passing said first fluid flow through a means which transfers energy between work energy and fluid flow energy while said first fluid flow is maintained separate from said second fluid flow; bringing said first and second fluid flows into contact so that they share a mutual free surface; generating a first trailed vorticity in said first fluid by means of a first vortex generator where the vortex filaments of said first trailed vorticity are concentrated and positioned near said mutual free surface where said first vortex filaments are approximately parallel to said mutual free surface; generating a second trailed vorticity by means of a second vortex generator where the vortex filaments of said second vorticity are concentrated and positioned near said mutual free surface and said filaments of said first vorticity and where said second vortex filaments are approximately parallel to said mutual free surface; where said first vortex generator is in said first fluid flow and said second vortex generator is in said second fluid flow and where the flow region in the first fluid flow and the flow region in the second fluid flow between which regions energy is transferred are further from the mutual free surface than are the vortex filaments trailed by the vortex generator associated with the respective flow regions.

22. A method of transferring energy as defined in claim 21 further including the step of: altering said first fluid flow by a flow directing means provided between said means which transfers energy between work energy and fluid flow energy and said first vortex generator.

23. A method of transferring energy to a first fluid flow from a second fluid flow, comprising the steps of: generating a first trailed vorticity in said first fluid flow by means of a first vortex generator where the vortex filaments of said first trailed vorticity are concentrated and positioned near the mutual free surface shared by said first and second fluid flows where said first vortex filaments are approximately parallel to said mutual free surface; generating a second trailed vorticity by means of a second vortex generator where the vortex filaments of said second vorticity are concentrated and positioned near said mutual free surface and said filaments of said first vorticity and where said second vortex filaments are approximately parallel to said mutual free surface; where said first vortex generator is in said first fluid flow and said second vortex generator is in said second fluid flow and where the flow region in the first fluid flow and the flow region in the second fluid flow between which regions energy is transferred are further from the mutual free surface than are the vortex filaments trailed by the vortex generator associated with the respective flow regions; separating said first and second fluid flows approximately at said mutual free surface; and passing said first fluid flow through a means which transfers energy between work energy and fluid flow energy.

24. A method of transferring energy as defined in claim 23 further including the step of: altering said first fluid flow by a flow directing means provided between said means which transfers energy between work energy and fluid flow energy and said first vortex generator.

* * * * *